(12) United States Patent
Kanai et al.

(10) Patent No.: US 7,902,884 B2
(45) Date of Patent: Mar. 8, 2011

(54) H-BRIDGE CIRCUIT

(75) Inventors: Miyuki Kanai, Tokyo (JP); Hirokazu Fujimaki, Miyazaki (JP); Takeshi Shimizu, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 7 days.

(21) Appl. No.: 12/585,749

(22) Filed: Sep. 23, 2009

(65) Prior Publication Data

US 2010/0073039 A1      Mar. 25, 2010

(30) Foreign Application Priority Data

Sep. 24, 2008    (JP) .................................. 2008-244235

(51) Int. Cl.
   *H02P 1/22*    (2006.01)
(52) U.S. Cl. .......................... 327/110; 327/494; 327/587
(58) Field of Classification Search .................. 327/110, 327/494, 588, 587
   See application file for complete search history.

(56) References Cited

U.S. PATENT DOCUMENTS

| 5,952,856 | A  | * | 9/1999  | Horiguchi et al. | ............ | 327/110 |
| 6,147,545 | A  | * | 11/2000 | Marshall         | ............ | 327/424 |
| 6,545,514 | B2 | * | 4/2003  | Barrow           | ............ | 327/110 |
| 7,592,852 | B2 | * | 9/2009  | Hsieh et al.     | ............ | 327/423 |

FOREIGN PATENT DOCUMENTS

| JP | 05-236797 A | 9/1993 |
| JP | 08-223993 A | 8/1996 |

* cited by examiner

*Primary Examiner* — Hai L Nguyen
(74) *Attorney, Agent, or Firm* — Rabin & Berdo, P.C.

(57) ABSTRACT

An H-bridge circuit includes a lower-arm field-effect transistor and a current supplying element that turns on when the drain of the lower-arm field-effect transistor is negatively biased due to regenerative current. When turned on, the current supplying element conducts current from the source to the drain of the lower-arm field-effect transistor, in parallel with a parasitic diode inherent in the lower-arm field effect transistor. The current supplying element competes with other parasitic elements that conduct current from peripheral circuitry to the drain of the lower-arm field-effect transistor, thereby reducing the amount of such current drawn through the peripheral circuitry and lessening the impact of the regenerative current on the peripheral circuits.

13 Claims, 18 Drawing Sheets

H-BRIDGE CIRCUIT

BACKGROUND OF THE INVENTION

1. Field of the Invention

The present invention relates to an H-bridge circuit in which the impact on peripheral circuitry of regenerative current occurring at transistor switching is reduced.

2. Description of the Related Art

H-bridge circuits including four transistors are commonly used for motor control. Referring to FIG. 1 the basic H-bridge circuit has a power supply terminal 1, a ground terminal 2, an n-channel metal-oxide-semiconductor field-effect transistor (MOSFET) $Q_1$ and an n-channel MOSFET $Q_2$ connected in series between the power supply terminal 1 and the ground terminal 2, and an n-channel MOSFET $Q_3$ and an n-channel MOSFET $Q_4$ connected in series between the power supply terminal 1 and the ground terminal 2. MOSFETs $Q_1$ and $Q_3$ are referred to as the upper arms of the H-bridge, and MOSFETs $Q_2$ and $Q_4$ as the lower arms. MOSFETs $Q_1, Q_2, Q_3, Q_4$ inherently include respective parasitic diodes $D_1, D_2, D_3, D_4$.

An inductive load, more specifically a coil load 5 is connected across the node 3 between MOSFETs $Q_1$ and $Q_2$ and the node 4 between MOSFETs $Q_3$ and $Q_4$. For simplicity, the coil load 5 is shown as a single coil. The MOSFETs $Q_1, Q_2, Q_3$, and $Q_4$ are connected through the coil load 5, forming an H network.

When MOSFETs $Q_1$ and $Q_4$ are turned on by their gate signals, current flows through the coil load 5 from node 3 to node 4, as indicated by the dotted arrow in FIG. 1. This current is referred to as forward current since it turns the motor in the forward direction. The motor speed can be adjusted by a pulse width modulation scheme in which MOSFET $Q_1$ or $Q_4$ is repeatedly switched on and off. When MOSFETs $Q_3$ and $Q_2$ are turned on by their gate signals, reverse current flows through the coil load 5. The reverse current flow can be used to brake or reverse the motor.

When MOSFET $Q_1$ is switched from the on state to the off state, due to a well-known characteristic of coils, current continues to flow through the coil load 5 in the same direction. This continuing current is referred to as regenerative current. Electrons carried out of the coil load 5 by the regenerative current have no place to go and are stored at node 3, as illustrated in FIG. 2. As a result, the drain of n-channel MOSFET $Q_2$ is negatively biased.

Consider the case in which a motor controller including the above H-bridge circuit is formed as a pn junction isolated semiconductor integrated circuit. In this semiconductor integrated circuit, the H-bridge circuit operates as an output stage for peripheral circuits disposed in separate pn junction isolated islands on the same chip. When regenerative current occurs, although the source of MOSFET $Q_2$ is at the lowest potential supplied to the integrated circuit, which is normally the potential of the p-type semiconductor substrate in which MOSFET $Q_2$ is formed, the drain of lower-arm MOSFET $Q_2$ becomes biased at a still lower potential.

The n-type drain region of MOSFET $Q_2$ is surrounded by regions of the opposite conductive type (p-type). When the drain of MOSFET $Q_2$ is negatively biased, the pn junctions between the n-type drain region and adjacent p-type regions becomes forward biased. The adjacent p-type regions may include the p-type body region of MOSFET $Q_2$, the p-type semiconductor substrate, and p-type isolation diffusion regions provided for pn junction isolation. The forward bias between these p-type regions and the n-type drain region permits current to flow toward the drain of MOSFET $Q_2$.

When this current flows from the p-type semiconductor substrate (through parasitic diode $D_5$), parasitic npn transistors (e.g., $Tr_1$) in which the substrate functions as a p-type base layer may turn on, supplying parasitic current to the drain of MOSFET $Q_2$ from peripheral circuits disposed as in separate islands in the same chip. The integrated circuit was not designed for this flow of parasitic current. The unanticipated parasitic current flow may alter supposedly fixed potentials in the islands in which the peripheral circuits are formed, causing unexpected current to flow through the peripheral circuits, leading to circuit malfunctions. A large parasitic current may turn on a parasitic thyristor, causing latchup, which may destroy the integrated circuit.

Similar problems can occur when MOSFET $Q_3$ is switched from the on state to the off state, creating regenerative current that negatively biases the drain of MOSFET $Q_4$.

The general method of solving the problems caused by regenerative current has been to put as much distance as possible between the lower-arm MOSFETs $Q_2$ and $Q_4$ of the H-bridge circuit and the peripheral circuits formed in the same chip. By separating the lower arms and the peripheral circuits, the direct current gain ($h_{FE}$) of parasitic npn transistors involving the p-type semiconductor substrate can be lowered to reduce the amount of current drawn from the peripheral circuits.

Circuit configurations that prevent the occurrence of parasitic current when the energy stored in the coil is released have also been proposed. In Japanese Patent Application Publication No. H8-223993, for example, Tominaga proposes a motor controller having regenerative diodes at both ends of the coil in the H-bridge, to feed regenerative current stored in the coil back to the power supply, and having capacitors for storing the regenerative current.

In Japanese Patent Application Publication No. H5-236797 (Now Japanese Patent No. 2974188), Kubotsuka proposes an H-bridge circuit in which a pair of recirculating diodes connected between the two ends of the coil and ground allow energy stored in the coil to escape. To keep the recirculating current from flowing into the current detecting resistor through the parasitic diodes in the lower arms of the bridge, power Darlington transistors, which do not form parasitic diodes, are used in the lower arms.

The conventional practice of distancing the lower arms from the peripheral circuits can mitigate the effect of regenerative current on the peripheral circuits but cannot fundamentally eliminate the effect. One alternative solution would be to isolate the element islands with dielectric regions or layers and block all the current that would otherwise flow through junction isolation regions and the substrate. However, fabrication of such a complete blocking structure would be complex, greatly increasing the cost of the integrated circuit.

Taking stored energy directly from the coil load as proposed by Tominaga and Kubotsuka also complicates the structure of the H-bridge circuit because, for one thing, the circuit must be designed so that the regenerative or recirculating diodes placed at the ends of the coil do not conduct current in normal operation.

SUMMARY OF THE INVENTION

An object of the present invention is to provide a simple H-bridge circuit that mitigates the effect on peripheral circuitry of regenerative current occurring at transistor switching.

The invention provides an H-bridge circuit having a power supply terminal, a ground terminal, a first node, a second node, a first upper-arm MOSFET that conducts current between the power supply terminal and the first node, a first lower-arm MOSFET that conducts current between the first node and the ground terminal, a second upper-arm MOSFET that conducts current between the power supply terminal and the second node, a second lower-arm MOSFET that conducts current between the second node and the ground terminal, and a coil load connected between the first node and the second node. The first and second lower-arm MOSFETs have sources connected to the ground terminal and drains connected to the first and second nodes, respectively, and have respective parasitic diodes.

A first current supplying element connected in parallel with the parasitic diode in the first lower-arm MOSFET conductively interconnects the source and drain of the first lower-arm MOSFET when the drain of the first lower-arm MOSFET is negatively biased, thereby supplying current to the drain of the first lower-arm MOSFET.

A second current supplying element connected in parallel with the parasitic diode in the second lower-arm MOSFET conductively interconnects the source and drain of the second lower-arm MOSFET when the drain of the second lower-arm MOSFET is negatively biased, thereby supplying current to the drain of the second lower-arm MOSFET.

The first and second current supplying elements may be parasitic npn transistors having the drains of the first and second lower-arm MOSFETs as emitters, n-type diffusion regions formed between pairs of p-type isolation diffusion regions as bases, and one p-type isolation diffusion region in each pair as a collector. These parasitic npn transistors compete with other parasitic elements that supply current to the drains of the first and second lower-arm MOSFETs from peripheral circuits when the drains of the first and second MOSFETs are negatively biased. The parasitic npn transistors thereby reduce the amount of current drawn from the peripheral circuits.

Alternatively, the first and second current supplying elements may be npn transistors having bases and collectors connected to the sources of the first and second lower-arm MOSFETs and emitters connected to the drains of the first and second lower-arm MOSFETs. These npn transistors perform the same function as the above parasitic npn transistors, but with a higher current gain.

Alternatively, the first and second supplying elements may be Schottky diodes having anodes connected to the sources of the first and second lower-arm MOSFETs and cathodes connected to the drains of the first and second lower-arm MOSFETs. These Schottky diodes perform the same function as the above parasitic npn transistors, but turn on more quickly.

Alternatively, the first and second supplying elements may be Schottky transistors including both npn transistors and Schottky diodes connected as described above.

The first and second current supplying elements reduce the effect of regenerative current on peripheral circuitry by reducing the resulting flow of parasitic current through the peripheral circuitry, and reducing potential fluctuations caused by such parasitic current flow. This effect can be achieved with a comparatively simple structure not requiring dielectric isolation of the lower-arm MOSFETs and not requiring regenerative diodes.

DETAILED DESCRIPTION OF THE INVENTION

Figure 2:
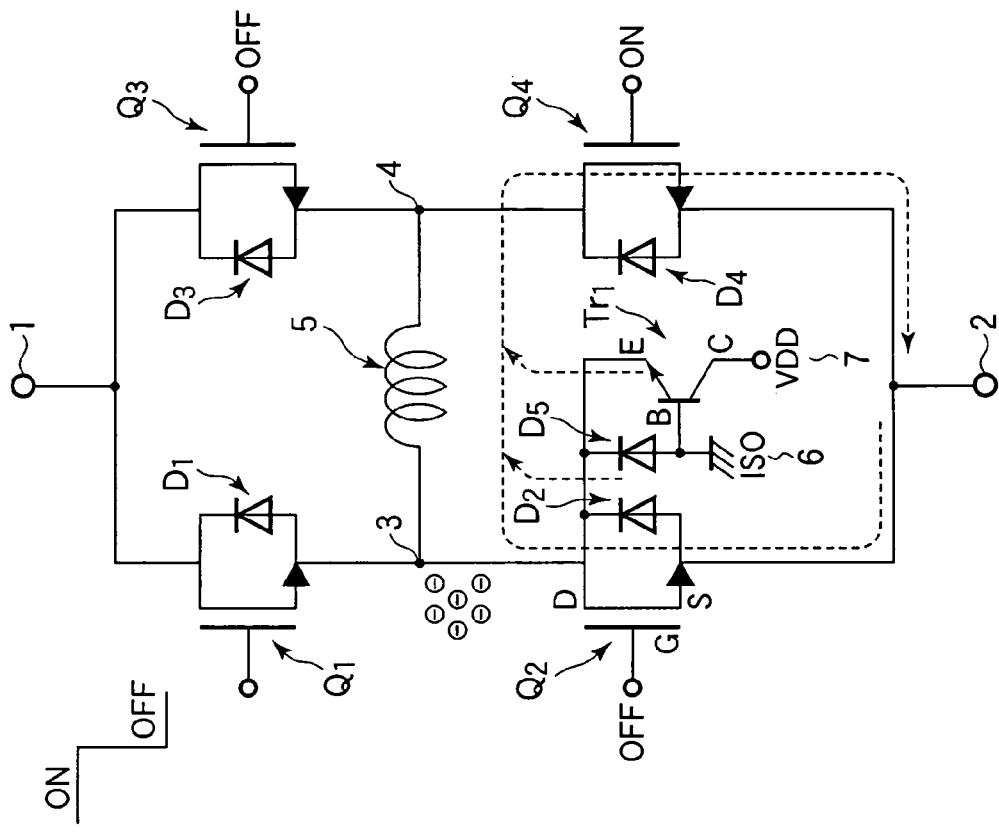
FIGS. 1 and 2 are circuit diagrams showing current paths in a basic H-bridge circuit.

Embodiments of the invention will now be described with reference to the attached drawings, in which like elements are indicated by like reference characters. The embodiments are H-bridge circuits suitable for motor control, although the invention is not limited to motor control.

First, the problems caused by regenerative current in the basic H-bridge circuit will be more specifically described with reference to FIGS. 1 to 4.

An integrated circuit is normally formed on a monocrystalline substrate referred to as a wafer by carrying out various processes that form a plurality of circuit elements having desired characteristics and isolation regions that electrically isolate the circuit elements, and electrically interconnecting the circuit elements with wiring. Such an integrated circuit will be referred to below as a (semiconductor) chip. The wiring is not shown in FIGS. 3 and 4.

Figure 3:
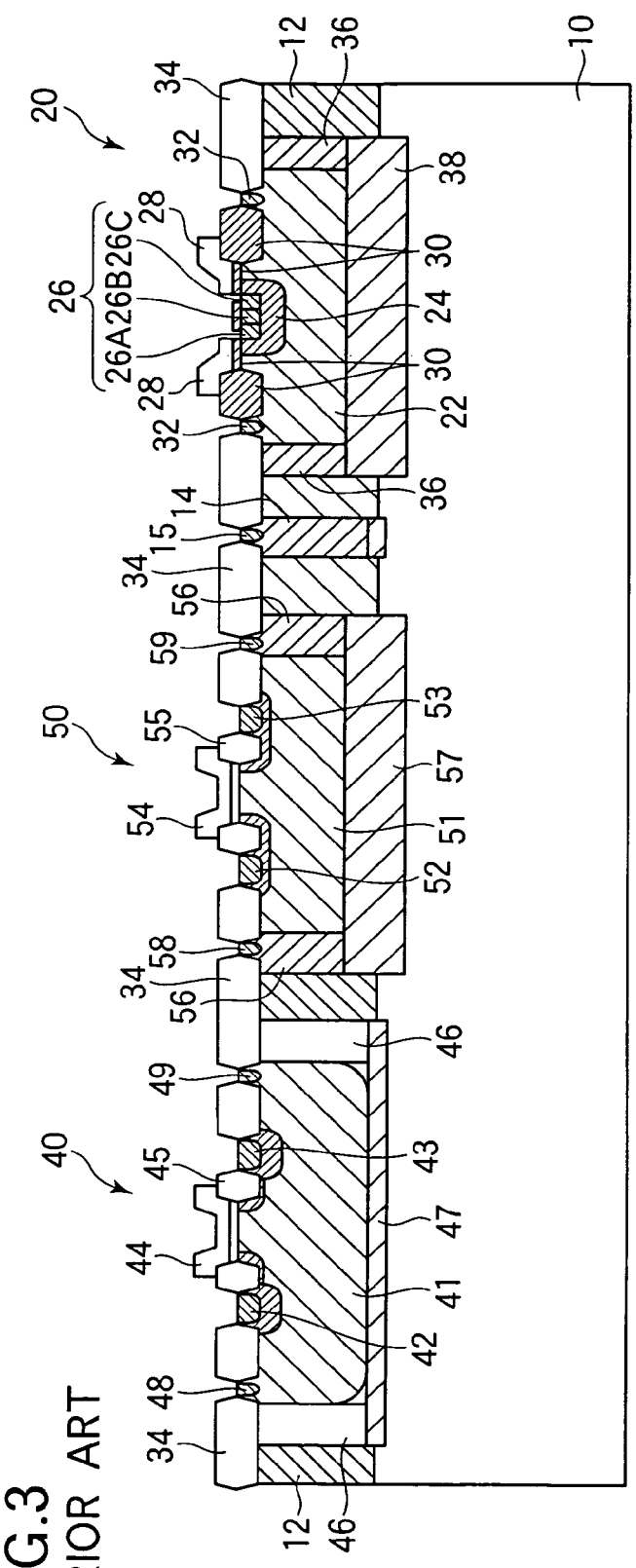
FIGS. 3 and 4 are schematic sectional views showing part of a conventional pn junction isolated semiconductor integrated circuit including the basic H-bridge circuit in FIGS. 1 and 2.

As shown in FIG. 3, the semiconductor integrated circuit has a semiconductor substrate 10 doped with a p-type impurity such as boron (B) or aluminum (Al). An epitaxial layer 12 doped with an n-type impurity such as phosphorus (P) or arsenic (As) is formed on the p-type semiconductor substrate 10. FIG. 3 shows only part of the chip structure, including a lateral double diffused metal-oxide-semiconductor transistor (LDMOS transistor) 20, a high-voltage n-channel MOSFET 40, a high-voltage p-channel MOSFET 50, and a p-type isolation diffusion region 14, all of which are formed in the n-type epitaxial layer 12.

The LDMOS transistor 20 represents either one of the lower-arm MOSFETs $Q_2$, $Q_4$ of the H-bridge circuit. The high-voltage MOSFETs 40, 50 represent part of the peripheral circuitry that is separate from the H-bridge circuit but integrated onto the same p-type semiconductor substrate 10. The purpose of the p-type isolation diffusion region 14 is to provide pn-junction isolation between the lower-arm MOSFET and peripheral circuitry 40, 50. The p-type isolation diffusion region 14 penetrates through the n-type epitaxial layer 12 to the p-type semiconductor substrate 10 between the LDMOS transistor 20 and the peripheral circuits. A $p^+$ diffusion region 15 is formed on the surface of the p-type isolation diffusion region 14.

Figure 4:
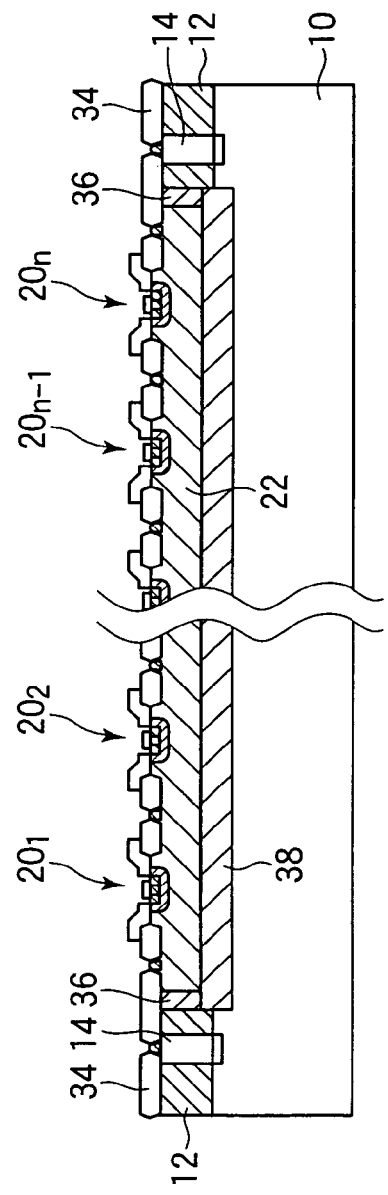

As shown in FIG. 4, normally, a plurality of LDMOS transistors $20_1$ to $20_n$, where n is an integer greater than one, are formed in parallel in a single island isolated by the p-type isolation diffusion region 14 to function as a high current output control device. FIG. 3 has been simplified to show only one LDMOS 20, in order to show its relation with the high-voltage MOSFETs 40 and 50 more clearly.

In the following description of the first and subsequent embodiments, LDMOS 20 will be identified with lower-arm MOSFET $Q_2$, with the understanding that the structures provided for MOSFET $Q_2$ are also provided separately for MOSFET $Q_4$.

The LDMOS transistor 20 is an n-channel MOSFET. In the region where the LDMOS transistor 20 is formed, an n-type buried layer 38 is formed for pn junction isolation, extending above and below the interface between the p-type semiconductor substrate 10 and n-type epitaxial layer 12. The n-type buried layer 38 is electrically coupled to the surface of the n-type epitaxial layer 12 by n-type sinkers 36 that penetrate through the n-type epitaxial layer 12 to the periphery of the n-type buried layer 38, thereby reducing the series resistance from the surface of the n-type epitaxial layer 12 to the n-type buried layer 38.

An n-type drain region 22 formed in the n-type epitaxial layer 12 is surrounded by the n-type sinkers 36 and the n-type buried layer 38. A p-type body diffusion region 24 is disposed at the surface of the n-type drain region 22. A source diffusion region 26 is formed at the surface of the p-type body diffusion region 24. The source diffusion region 26 includes a pair of $n^+$ source diffusion regions 26A, 26C disposed on both sides of a $p^+$ back gate diffusion region 26B. When the LDMOS transistor 20 is turned on, a channel forms in the p-type body diffusion region 24 between the $n^+$ source diffusion regions 26A, 26C and the n-type drain region 22.

An $n^+$ drain diffusion region 32 is formed at the surface of the n-type drain region 22, near its periphery, as a contact region. The peripheral surface of the p-type body diffusion region 24 and the surface of the n-type drain region 22 between the p-type body diffusion region 24 and the $n^+$ drain diffusion region 32 are covered by a gate insulation layer 30 formed from a dielectric material such as silicon oxide ($SiO_2$). A thick field oxide layer 34 is formed by local oxidation of silicon (LOCOS) at the surface of the epitaxial layer 12 just outside the $n^+$ drain diffusion region 32. Similar field oxide layers 34 are formed at other points, e.g., between the $p^+$ diffusion region 15 and the $n^+$ drain diffusion region 32. Part of the gate insulation layer 30 is also thickened by the local oxidization process, as shown.

A gate electrode 28 is formed from polycrystalline silicon or an equivalent material on the gate insulation layer 30. The p-type body diffusion region 24 is interconnected through the $p^+$ back gate diffusion region 26B and wiring (not shown) to the $n^+$ source diffusion regions 26A, 26C.

Peripheral MOSFET 40 is a high-voltage n-channel MOSFET formed in a p-type well 41 located in part of the n-type epitaxial layer 12. The p-type well 41 is surrounded by p-type sinkers 46 and a p-type buried layer 47. An $n^+$ source diffusion region 42 and an $n^+$ drain diffusion region 43 are formed at the surface of the p-type well 41.

The $n^+$ source and drain diffusion regions 42, 43 are formed in respective n-type regions referred to as N-tubs. An n-type impurity is diffused at low concentration into the N-tubs and at high concentration into the $n^+$ source and drain diffusion regions 42, 43. A gate electrode 44 is formed over the channel between the $n^+$ source diffusion region 42 and $n^+$ drain diffusion region 43, separated from the channel by a gate insulating layer 45. A pair of $p^+$ diffusion regions 48, 49 are formed at the surface of the p-type well 41, to permit biasing of the p-type well 41.

Peripheral MOSFET 50 is a high-voltage p-channel MOSFET located in an n-type well 51, which is simply the part of the n-type epitaxial layer 12 in which MOSFET 50 is formed. The n-type well 51 is surrounded by n-type sinkers 56 and an n-type buried layer 57. A $p^+$ source diffusion region 52 and a $p^+$ drain diffusion region 53 are formed at the surface of the n-type well 51.

The $p^+$ source and drain diffusion regions 52, 53 are formed by diffusing a p-type impurity at a high concentration into the n-type epitaxial layer 12 (n-type well 51), in which no p-type impurity is originally present. A gate electrode 54 is formed over the channel between the $p^+$ source diffusion region 52 and $p^+$ drain diffusion region 53, separated from the channel by a gate insulating layer 55. A pair of $n^+$ diffusion regions 58, 59 are formed at the surface of the n-type sinkers 56.

How a parasitic npn transistor is turned on when transistor switching occurs will be explained with reference to FIG. 5. As described above, the p-type isolation diffusion region 14, LDMOS transistor 20, high-voltage re-channel MOSFET 40, and high-voltage p-channel MOSFET 50 are formed in the n-type epitaxial layer 12 on the p-type semiconductor substrate 10. The LDMOS transistor 20 and the peripheral devices are located in separate islands, resting on the p-type semiconductor substrate 10 and separated from each other by the p-type isolation diffusion region 14. These islands are normally biased at potentials equal to or higher than the potential of the p-type semiconductor substrate 10, which is normally at the lowest potential in the chip. That is, the islands are reverse biased with respect to the p-type semiconductor substrate 10.

As described earlier with reference to FIG. 2, regenerative current occurs when the gate signal of MOSFET $Q_1$ is switched from the on state to the off state. The regenerative current negatively biases the drain of MOSFET $Q_2$, that is, of the LDMOS transistor 20 in FIG. 5. The negative bias is schematically indicated by the battery symbol in FIG. 5 between the source terminal 62 and drain of the LDMOS transistor 20. The source terminal 62 is connected to the ground terminal 2 in FIG. 1 and is at the ground potential (GND), as is the p-type substrate 10. Under this negative bias, the $n^+$ drain diffusion region 32, the n-type drain region 22, and the adjacent n-type sinkers 36 and n-type buried layer 38 are at a negative potential with respect to the p-type substrate 10.

This negative potential causes the junction between the p-type body diffusion region 24 and the n-type drain region 22 in the LDMOS transistor 20 to be forward biased, allowing current to flow from the p-type body diffusion region 24 to the n+ drain diffusion region 32 through the parasitic diode $D_2$ of the LDMOS transistor 20 ($Q_2$). The junction between the p-type semiconductor substrate 10 and the n-type drain region 22 is also forward biased, allowing current to flow from the p-type semiconductor substrate 10 to the n+ drain diffusion region 32 through parasitic diode $D_5$.

The p-type isolation diffusion region 14 is connected through the p+ diffusion region 59 and metal wiring to an isolation (ISO) terminal 6 and is biased at ground potential. Normally, this isolates LDMOS transistor 20 from the peripheral circuits. When the drain of LDMOS transistor 20 is negatively biased, however, parasitic npn transistors may turn on. These parasitic npn transistors have the drain and adjacent n-type regions of LDMOS transistor 20 as their emitters, the p-type isolation diffusion region 14 and the p-type semiconductor substrate 10 as their bases, and n-type regions of peripheral circuit elements as their collectors. When they turn on, current can flow from the n-type regions in the peripheral circuits to the drain of LDMOS transistor 20.

Figure 5:
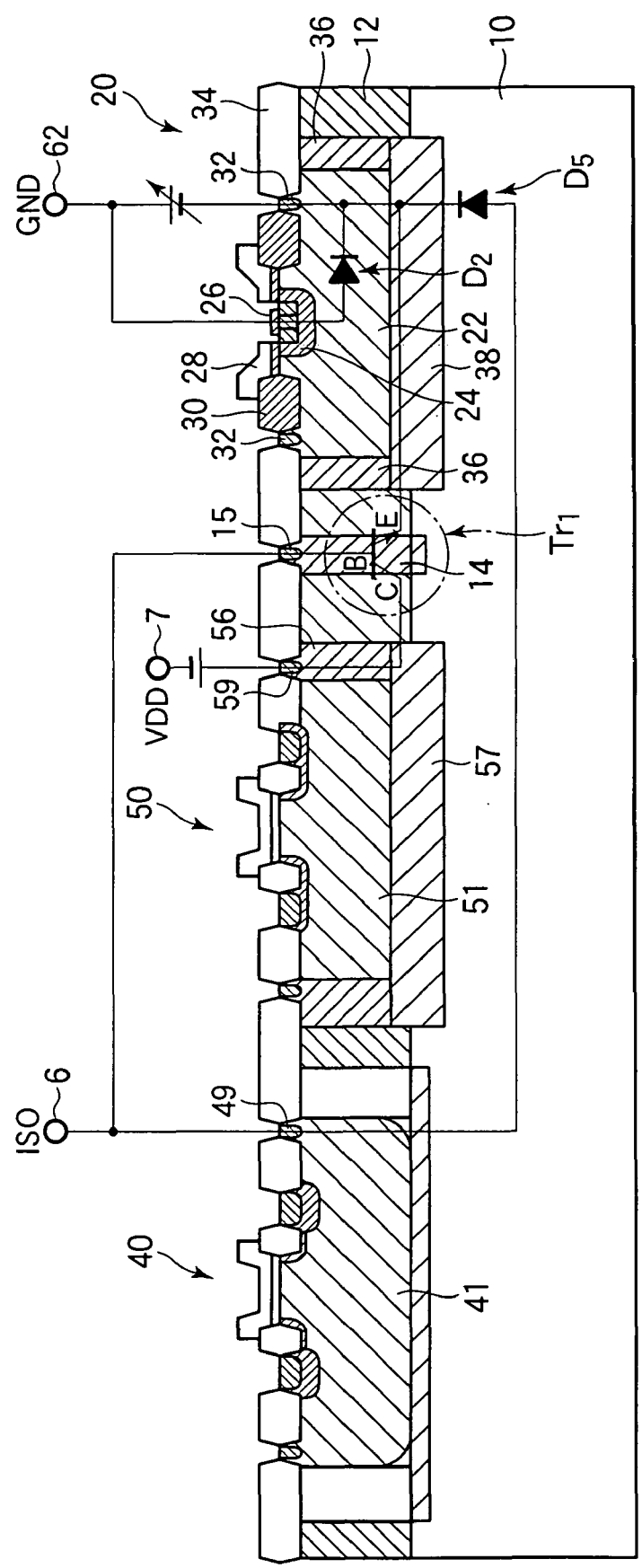
FIG. 5 is a diagram illustrating how a parasitic npn transistor is turned on in FIG. 3.

In FIG. 5, a parasitic npn transistor $Tr_1$ having the n-type drain region 22, n+ drain diffusion region 32, and n-type buried layer 38 as its emitter, the p-type isolation diffusion region 14 as its base, and an n-type sinker 56, the n-type buried layer 57, and an n+ diffusion region 59 of high-voltage p-channel MOSFET 50 as its collector turns on. The n+ diffusion region 59 is connected to a power supply (VDD) terminal 7 that normally holds the n-type well 51, n-type sinkers 56, and n-type buried layer 57 at the VDD potential, preventing current flow between then and the p-type semiconductor substrate 10. When parasitic npn transistor $Tr_1$ turns on, however, it can conduct current from the power supply terminal 7 to the drain of the LDMOS transistor 20.

Accordingly, when the parasitic npn transistor $Tr_1$ turns on, it can conduct current from both the isolation terminal 6 and power supply terminal 7 through the peripheral circuits to the drain of the LDMOS transistor 20. This parasitic current flows from the isolation terminal 6 through p-type regions such as the p-type semiconductor substrate 10, p-type isolation diffusion region 14, p-type well 41, and p+ diffusion region 49, and from the power supply terminal 7 through n-type regions such as the n-type sinker 56, n-type buried layer 57, and n+ diffusion regions 59.

Referring again to FIG. 2, when regenerative current occurs at the switching of the gate signal of MOSFET $Q_1$ from the on state to the off state, the drain of MOSFET $Q_2$ (LDMOS transistor 20) is negatively biased, allowing parasitic diodes $D_2$, $D_5$ to conduct forward current and turning on parasitic npn transistor $Tr_1$, which also conducts current. These currents are supplied through the drain of MOSFET $Q_2$ to node 3, allowing the electrons stored at node 3 to escape through MOSFET $Q_4$ to the ground terminal 2, but current is also drawn from the isolation terminal 6 and power supply terminal 7 through the peripheral circuits, causing local potential variations that can lead to malfunctions of the peripheral circuits. If a large amount of current is drawn, latchup may occur, destroying the device, as noted above.

Figure 6:
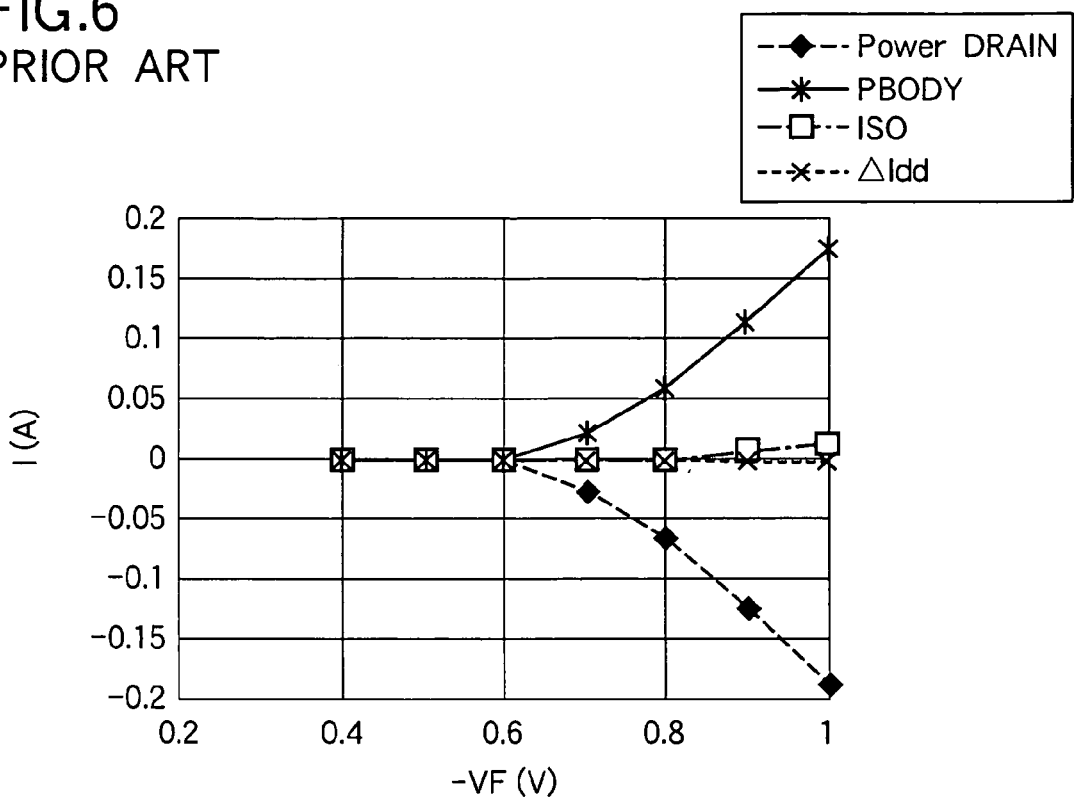
FIGS. 6 and 7 are graphs of parasitic current values at different negative drain bias voltages in FIG. 5.
Figure 7:
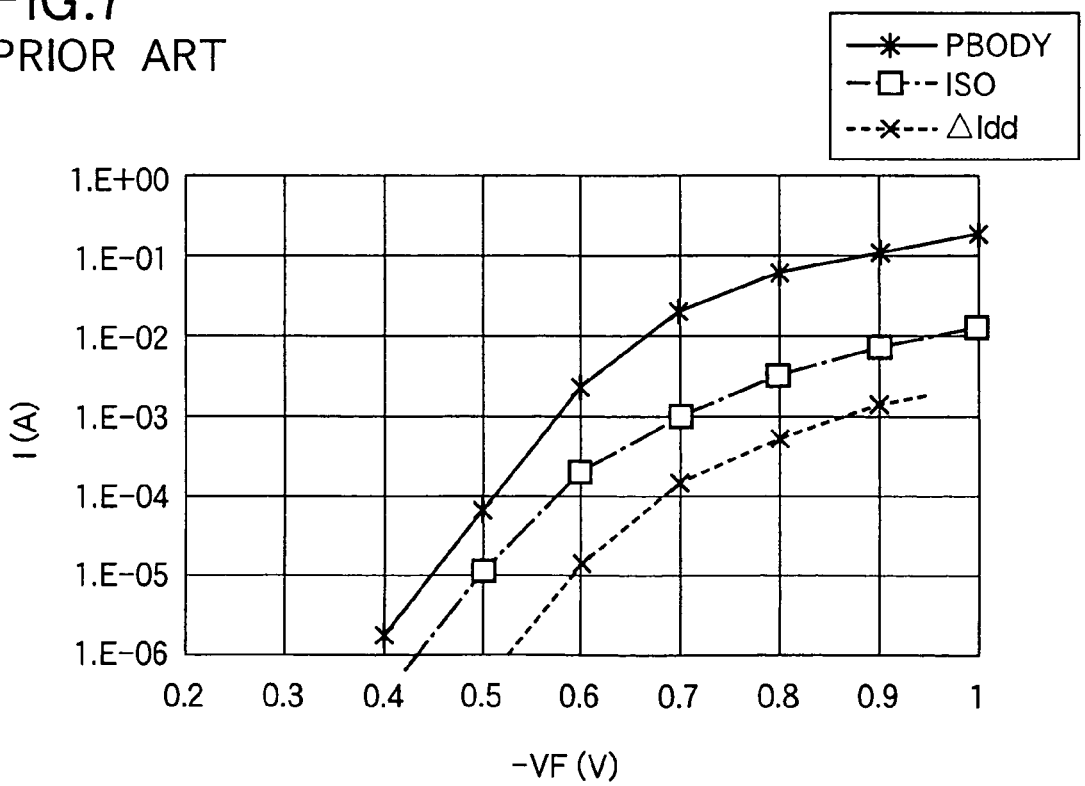

These effects are illustrated in more detail by the graphs in FIGS. 6 and 7, in which the horizontal axis represents the negative voltage –VF of the drain in volts (V). The vertical axis in FIG. 6 represents current I in amperes (A) as measured at various points. The vertical axis in FIG. 7 represents the positive currents on a logarithmic scale. The Power DRAIN curve in FIG. 6 indicates current flow at a drain terminal (not shown) connected to the n+ drain diffusion region 32. The PBODY curve indicates current flow at a terminal (not shown) connected to the p-type body diffusion region 24. The ISO curve indicates current flow at the isolation terminal 6, and the ΔIdd curve indicates current flow at the power supply terminal 7. Some of the ISO current and all of the ΔIdd current is drawn from peripheral circuits as diode current flowing through parasitic diode $D_5$ and collector current flowing through parasitic npn transistors such as $Tr_1$ in FIG. 5.

In FIG. 6, the negative Power DRAIN current is equal in magnitude to the sum of the positive PBODY, ISO, and ΔIdd currents. The PBODY current accounts for most of the positive current flow. In the logarithmic representation in FIG. 7, it can be seen that current (ISO) input from the isolation terminal 6 accounts for approximately 10% of the total positive current, and current (ΔIdd) input from the power supply terminal 7 accounts for about 1% of the total.

A semiconductor integrated circuit used for motor control is designed to control ampere-order output current, so even 1% of the total positive current can represent a milliampere-order current flow. The parasitic currents drawn through the peripheral circuits of the H-bridge circuit can exceed the currents that the peripheral circuit elements are designed to conduct. The result is current and potential values in the peripheral circuits that deviate considerably from the design values of those circuits.

The present invention provides a new H-bridge circuit that can reduce the effect on peripheral circuits of regenerative current occurring at MOSFET switching, by altering the basic H-bridge circuit design described above without requiring additional dielectric isolation structures or regenerative current diodes.

First Embodiment

Figure 1:
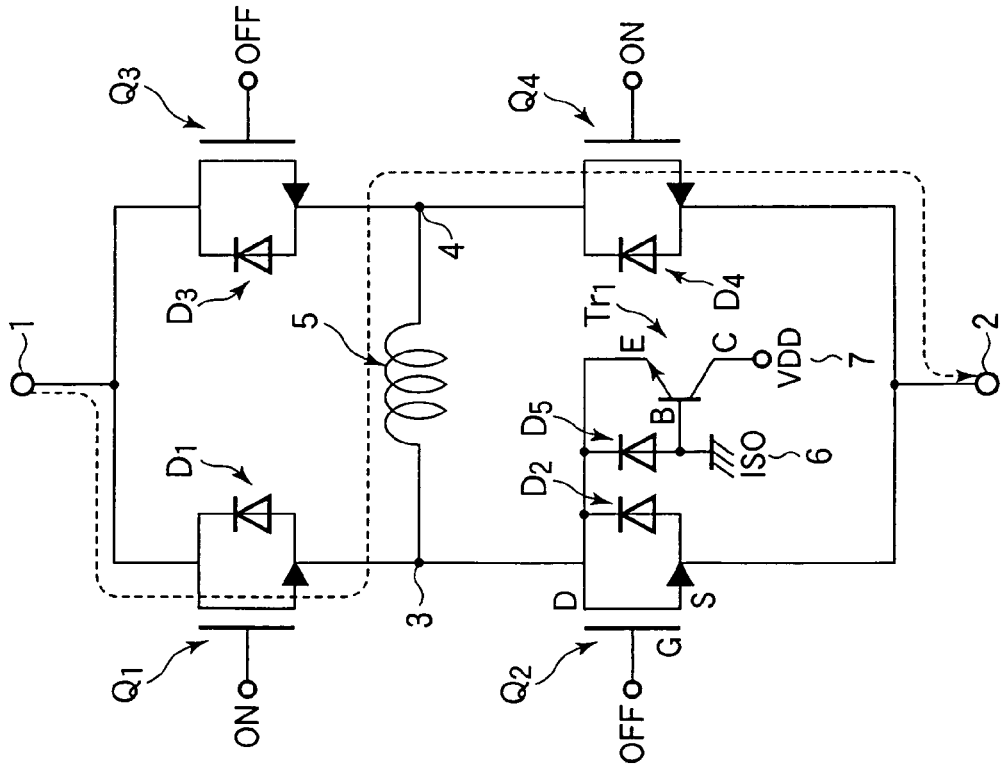
Figure 8:
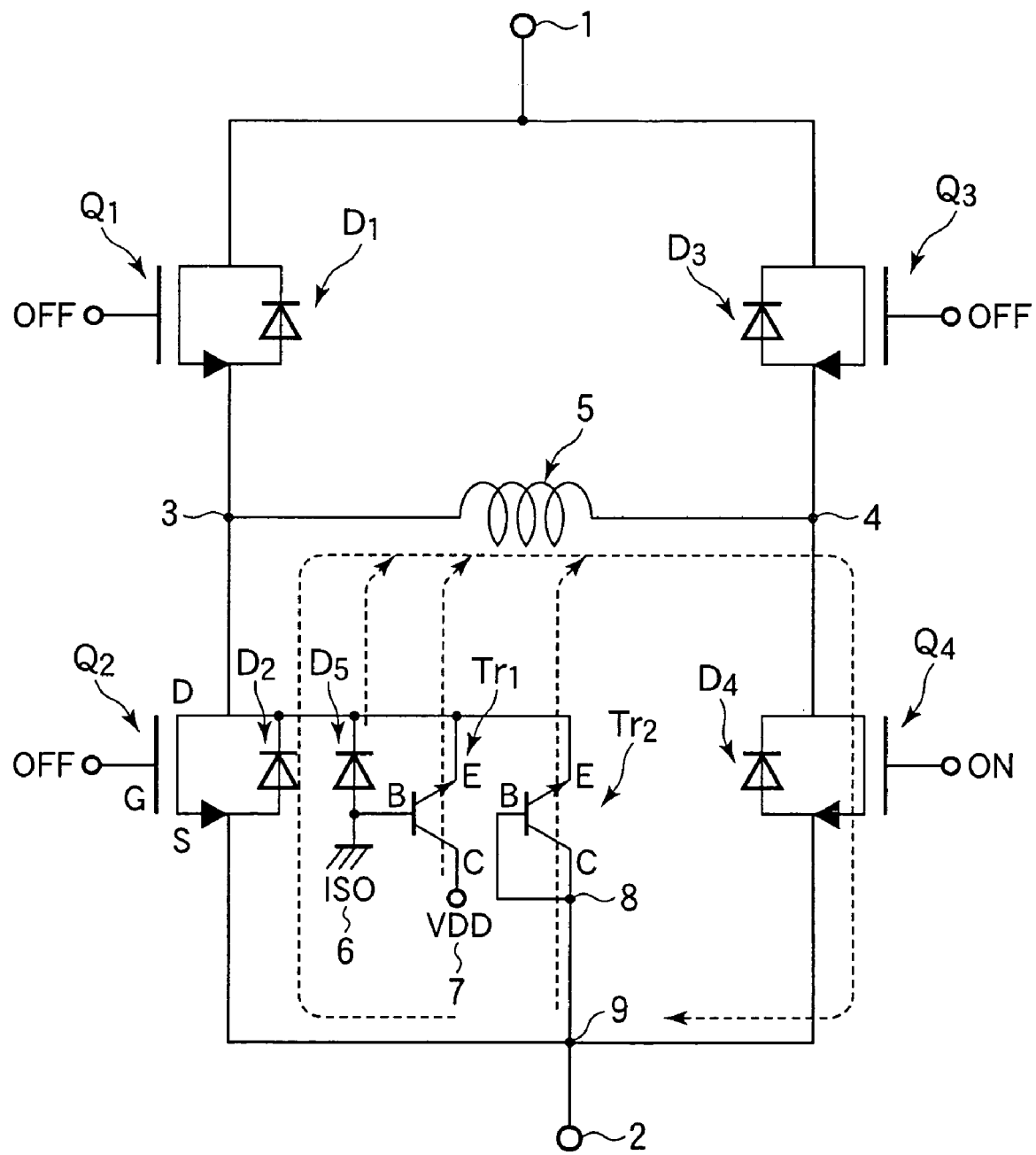
FIG. 8 is a circuit diagram showing the structure of an H-bridge circuit in a first embodiment of the invention.

Referring to FIG. 8, the H-bridge circuit in the first embodiment is similar to the basic H-bridge circuit shown in FIGS. 1 and 2 except that a new parasitic npn transistor ($Tr_2$) is generated when regenerative current occurs. Like the conventional parasitic npn transistor ($Tr_1$), the new parasitic npn transistor $Tr_2$ turns on when the gate signal of MOSFET $Q_1$ is switched from the on state to the off state, regenerative current is stored in the node 3, and the drain of n-channel MOSFET $Q_2$ is negatively biased.

Like the conventional basic H-bridge circuit, the H-bridge circuit in the first embodiment has a power supply terminal 1, a ground terminal 2, an n-channel MOSFET $Q_1$ and an n-channel MOSFET $Q_2$ connected in series between the power supply terminal 1 and the ground terminal 2, and an re-channel MOSFET $Q_3$ and an n-channel MOSFET $Q_4$ connected in series between the power supply terminal 1 and the ground terminal 2; forms parasitic diodes $D_1$, $D_2$, $D_3$, and $D_4$ in association with MOSFETs $Q_1$, $Q_2$, $Q_3$, and $Q_4$, respectively; and outputs current to a coil load 5 connected across the node 3 between MOSFETs $Q_1$ and $Q_2$ and the node 4 between MOSFETs $Q_3$ and $Q_4$.

Figure 9:
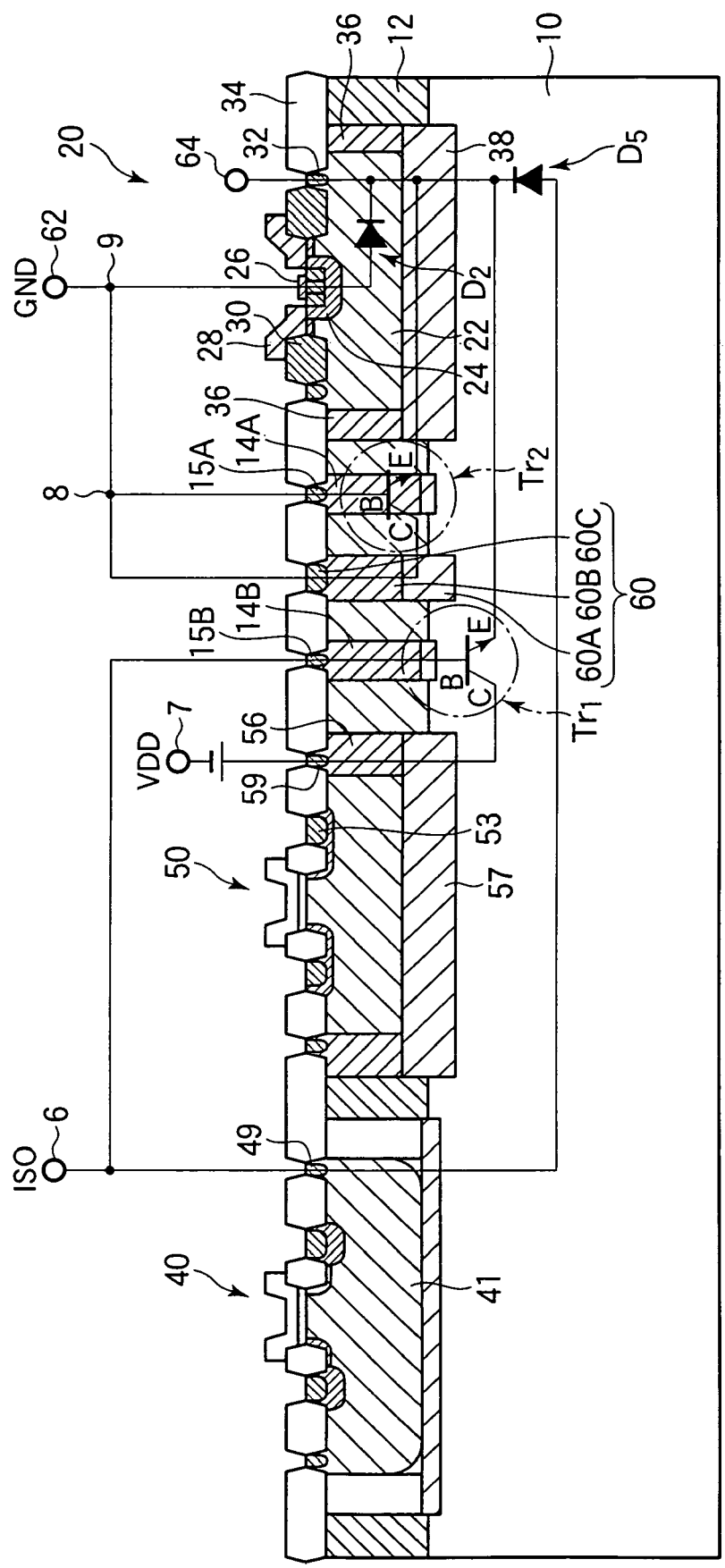
FIG. 9 is a schematic sectional view showing part of a pn junction isolated semiconductor integrated circuit including the H-bridge circuit in FIG. 8.

FIG. 9 schematically shows part of a pn junction isolated integrated circuit that uses the H-bridge circuit in FIG. 8 for motor control. The LDMOS transistor 20 in FIG. 9, which represents lower-arm MOSFET $Q_2$ or $Q_4$ in FIG. 8, has two p-type diffusion regions that provide pn junction isolation from peripheral high-voltage MOSFETs 40 and 50. An n-type diffusion region is present created these two p-type diffusion regions. In other respects, the structure in FIG. 9 is similar to the conventional structure shown in FIG. 3. Descriptions of elements shown in FIG. 3 will be omitted.

The n-type epitaxial layer 12 formed on the p-type semiconductor substrate 10 has two p-type diffusion isolation regions 14A and 14B for pn junction isolation of LDMOS transistor 20 from the peripheral circuits. These p-type regions 14A and 14B penetrate through the n-type epitaxial layer 12 to the p-type semiconductor substrate 10. A p$^+$ diffusion region 15A is formed at the surface of p-type isolation region 14A, and a p$^+$ diffusion region 15B is formed at the surface of p-type isolation region 14B.

The n-type epitaxial layer 12 also has an n-type region 60 formed between the two p-type isolation regions 14A and 14B. The n-type region 60 also penetrates through the n-type epitaxial layer 12 to the p-type semiconductor substrate 10. The n-type region 60 includes three n-type diffusion regions: an n$^+$ diffusion region 60A, an n$^-$ diffusion region 60B, and an n$^+$ diffusion region 60C. Of the two n$^+$ diffusion regions, region 60A extends above and below the interface between the p-type semiconductor substrate 10 and n-type epitaxial layer 12, and region 60C is formed at the surface of the n-type diffusion region 60. The n$^-$ diffusion region 60B extends from the n$^+$ diffusion region 60A to the n$^+$ diffusion region 60C.

The p-type isolation region 14A and the n-type diffusion region 60 are electrically connected by wiring to a node 8. Node 8 is electrically connected by wiring to a node 9 disposed between the source diffusion region 26 and a source terminal 62, which is connected to the ground terminal 2 in FIG. 8. The p-type isolation region 14A and the n-type diffusion region 60 (node 8) are therefore at the same potential as the source terminal 62 of the LDMOS transistor 20 (node 9). FIG. 9 also shows a drain terminal 64 connected to the n$^+$ drain diffusion region 32.

In the above structure, regenerative current occurs when the gate signal of MOSFET Q$_1$ is switched from the on state to the off state, as shown in FIG. 8. Because of the regenerative current, the drain of MOSFET Q$_2$ is biased to a negative voltage. As in the basic H-bridge circuit (see FIG. 5), current flows through parasitic diodes D$_2$ and D$_5$, but in this embodiment MOSFET Q$_2$ (LDMOS transistor 20) is pn junction isolated by two p-type isolation regions 14A and 14B as shown in FIG. 9. When the drain of MOSFET Q$_2$ (LDMOS transistor 20) is negatively biased, parasitic npn transistors Tr$_1$ and Tr$_2$ having the drain of LDMOS transistor 20 as their emitters, p-type isolation regions 14A and 14b as their bases, and n-type regions as their collectors turn on and supply current through the drain of LDMOS transistor 20 to power supply terminal 1.

Parasitic npn transistor Tr$_1$ has the n-type drain region 22, n$^+$ drain diffusion region 32, and n-type buried layer 38 as its emitter, p-type isolation region 14B as its base, and the n-type sinker 56, n-type buried layer 57, and n$^+$ diffusion region 59 of high-voltage p-channel MOSFET 50 as its collector, as in the conventional circuit (FIG. 5). Parasitic npn transistor Tr$_2$ has the n-type drain region 22, n$^+$ drain diffusion region 32, and n-type buried layer 38 as its emitter, p-type isolation region 14A as its base, and the n-type diffusion region 60 as its collector.

Parasitic npn transistor Tr$_2$ is closer than parasitic npn transistor Tr$_1$ to the LDMOS transistor 20 and has a greater current gain (h$_{FE}$). In the first embodiment, the parasitic drain current supplied through the intentionally formed parasitic npn transistor Tr$_2$ replaces a substantial amount of the parasitic drain current drawn from the isolation terminal 6 and power supply terminal 7 through the peripheral circuits and parasitic npn transistor Tr$_1$ in the conventional circuit. The reduction in parasitic current flow through the peripheral circuits prevents malfunctions of the peripheral circuits.

Figure 10:
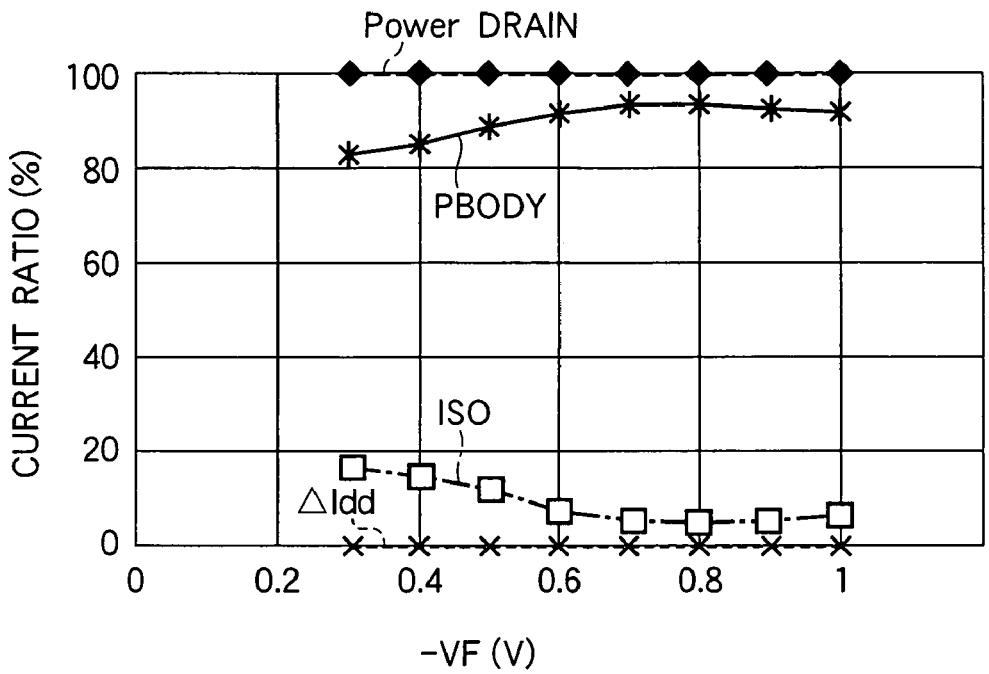
FIG. 10 is a graph indicating the percentages of current flow on various paths in the conventional circuit in FIG. 5.
Figure 11:
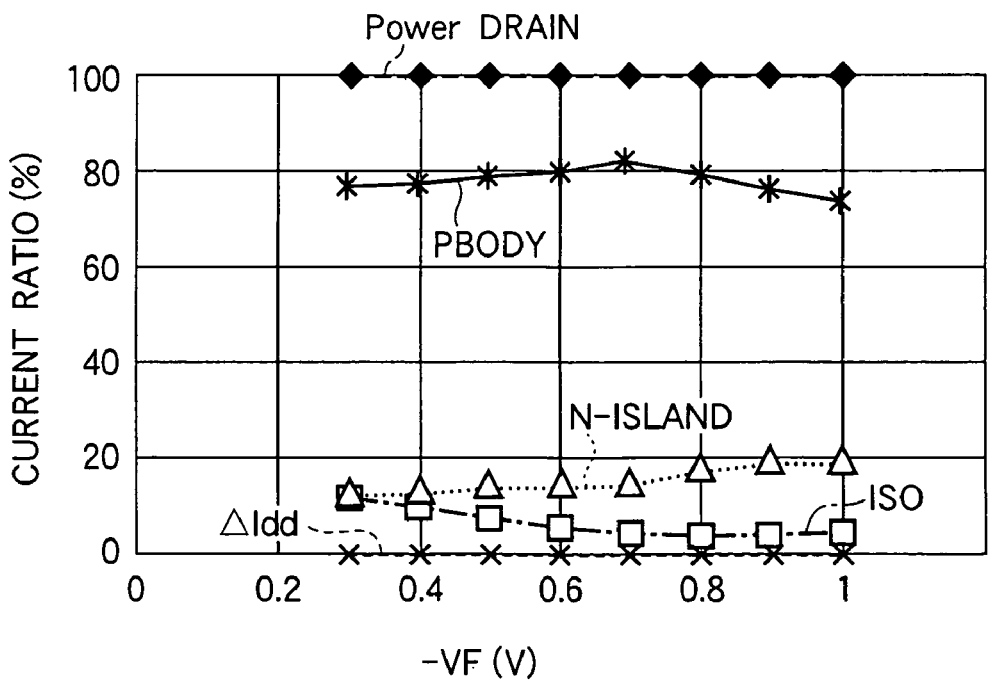
FIG. 11 is a graph showing the percentages of current flow on various paths in FIG. 9.

The graphs in FIGS. 10 to 13 illustrate the effects of negative bias of the drain of the LDMOS transistor 20 in the H-bridge circuit of the first embodiment and the conventional circuit (shown in FIGS. 1 to 5). FIG. 10 shows the percentages of the total parasitic drain current (indicated by black diamond marks) accounted for by the body current (PBODY, asterisk marks) conducted through parasitic diode D$_2$, the isolation current (ISO, square marks) conducted mainly through parasitic diode D$_5$ and partly through the base of parasitic npn transistor Tr$_1$, and the current (ΔIdd, X marks) conducted through the collector of parasitic npn transistor Tr$_1$ in the conventional circuit. FIG. 11 is a similar graph for the H-bridge circuit in the first embodiment, also indicating the current (N-ISLAND, triangular marks) conducted through the new parasitic npn transistor Tr$_2$. The data in FIGS. 10 and 11 are for a circuit in which the power supply terminal 7 is located at a distance of 50 μm from the LDMOS transistor 20.

The horizontal axis in FIGS. 10 and 11 represents the negative bias −VF (in volts) of the drain, and the vertical axis represents the percentages of current flow at different terminals, 100% representing the total drain current flow. The n-island current in FIG. 11 represents current flow at an n-island terminal (not shown) connected to the n-type diffusion region 60. As the negative bias −VF increases, the n-island current increases to about 20% of the total parasitic drain current.

As a result, the parasitic body current (PBODY) and parasitic isolation current (ISO) are both decreased as compared with the basic values in FIG. 10. Unlike the isolation current, much of which flows through the p-type well 41 of the high-voltage n-channel MOSFET 40 in FIG. 9, none of the n-island current is drawn from peripheral circuits. The current path provided by the new parasitic npn transistor Tr$_2$ thus decreases the amount of current drawn from the peripheral circuits, as can be confirmed experimentally.

Figure 12:
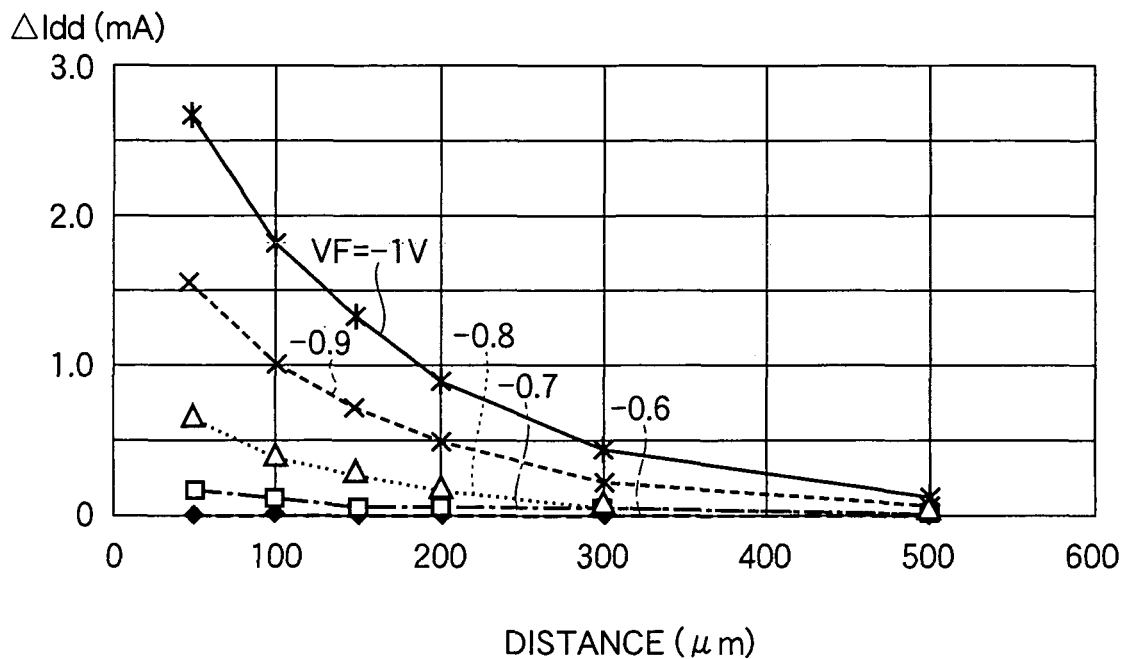
FIG. 12 is a graph of parasitic drain current drawn from the power supply terminal in the conventional circuit in FIG. 5 as a function of distance from the lower arm of the H-bridge.
Figure 13:
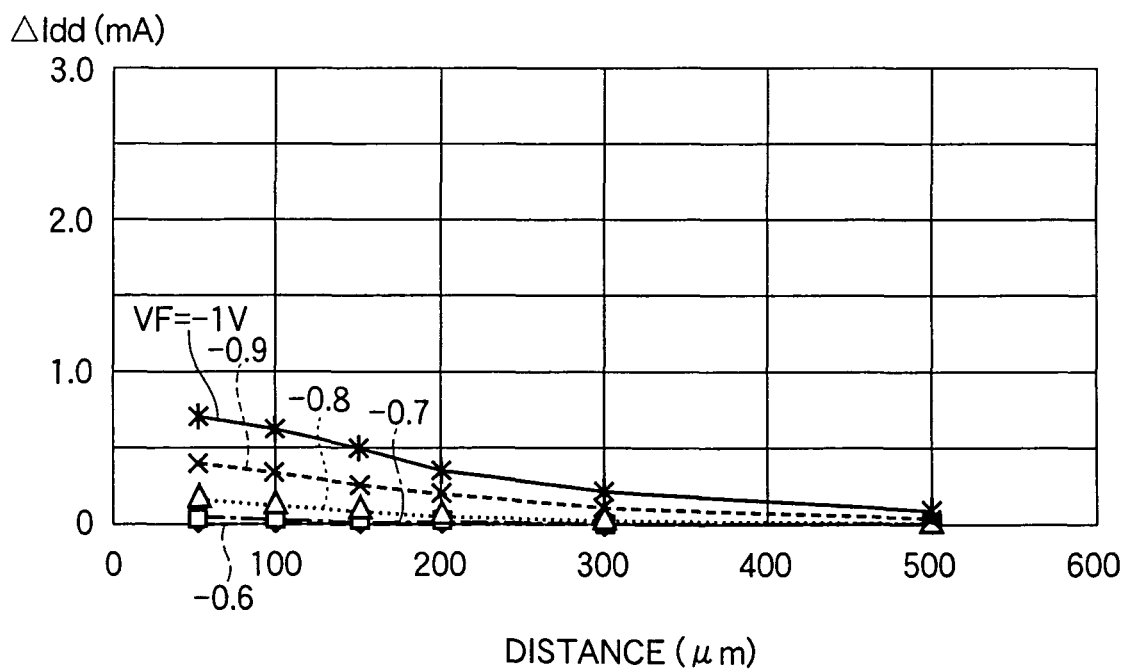
FIG. 13 is a graph of parasitic drain current drawn from the power supply terminal in FIG. 9 as a function of distance from the lower arm of the H-bridge.

FIG. 12 shows how the parasitic current flow at the power supply terminal 7 changes with respect to distance from the LDMOS transistor 20 to the power supply terminal 7 in the basic H-bridge circuit for five values of the negative drain bias −VF: −0.6 V, −0.7 V, −0.8 V, −0.9 V, and −1 V. FIG. 13 shows how the parasitic current flow at the power supply terminal 7 changes with respect to distance from the LDMOS transistor 20 to the power supply terminal 7 in the H-bridge circuit in the first embodiment for four negative drain bias values −VF: −0.7 V, −0.8 V, −0.9 V, and −1 V.

In FIGS. 12 and 13, the horizontal axis represents the distance in micrometers (μm) between the LDMOS transistor 20 and the power supply terminal 7, and the vertical axis represents current ΔIdd input from the power supply terminal 7 in milliamperes (mA). A comparison between FIGS. 12 and 13 indicates that ΔIdd is roughly halved in the first embodiment, regardless of the value of the negative drain bias. This effect is also due to the new parasitic npn transistor Tr$_2$. Even when the power supply terminal 7 is only 50 μm from the LDMOS transistor 20, the ΔIdd current is less than 1 mA. In contrast, the ΔIdd current value in the basic H-bridge circuit (FIG. 10) approaches 3 V for a negative bias of −1 V. The reduction in parasitic ΔIdd current due to the new parasitic npn transistor Tr$_2$ can also be confirmed experimentally.

As described above, the H-bridge circuit in the first embodiment isolates the LDMOS transistor 20 (MOSFET Q$_2$) from peripheral circuitry 40, 50 with two p-type isolation regions, and forms a new n-type diffusion region between the two p-type isolation regions. Both the p-type isolation regions and the n-type diffusion region are biased at the same potential as the source of the LDMOS transistor 20.

With this configuration, if the drain of the LDMOS transistor (MOSFET Q$_2$) is negatively biased by regenerative current when MOSFET Q$_1$ is switched off, a new parasitic npn transistor is generated to establish a new conductive path between the source and drain of the LDMOS transistor, in parallel with the conventional parasitic diode path. Conduction of current through the new parasitic npn transistor reduces the current drawn from peripheral circuits. Therefore, when MOSFET $Q_1$ is switched off, the effect of the resulting regenerative current on the peripheral circuits is reduced, as compared with the basic H-bridge circuit illustrated in FIG. 5.

Another feature of the first embodiment is that the new parasitic npn transistor resides in a double isolation structure that only requires additional p-type and n-type diffusion regions, making it simpler than improved H-bridge structures that require additional dielectric isolation structures or additional regenerative current diodes.

Second Embodiment

Figure 14:
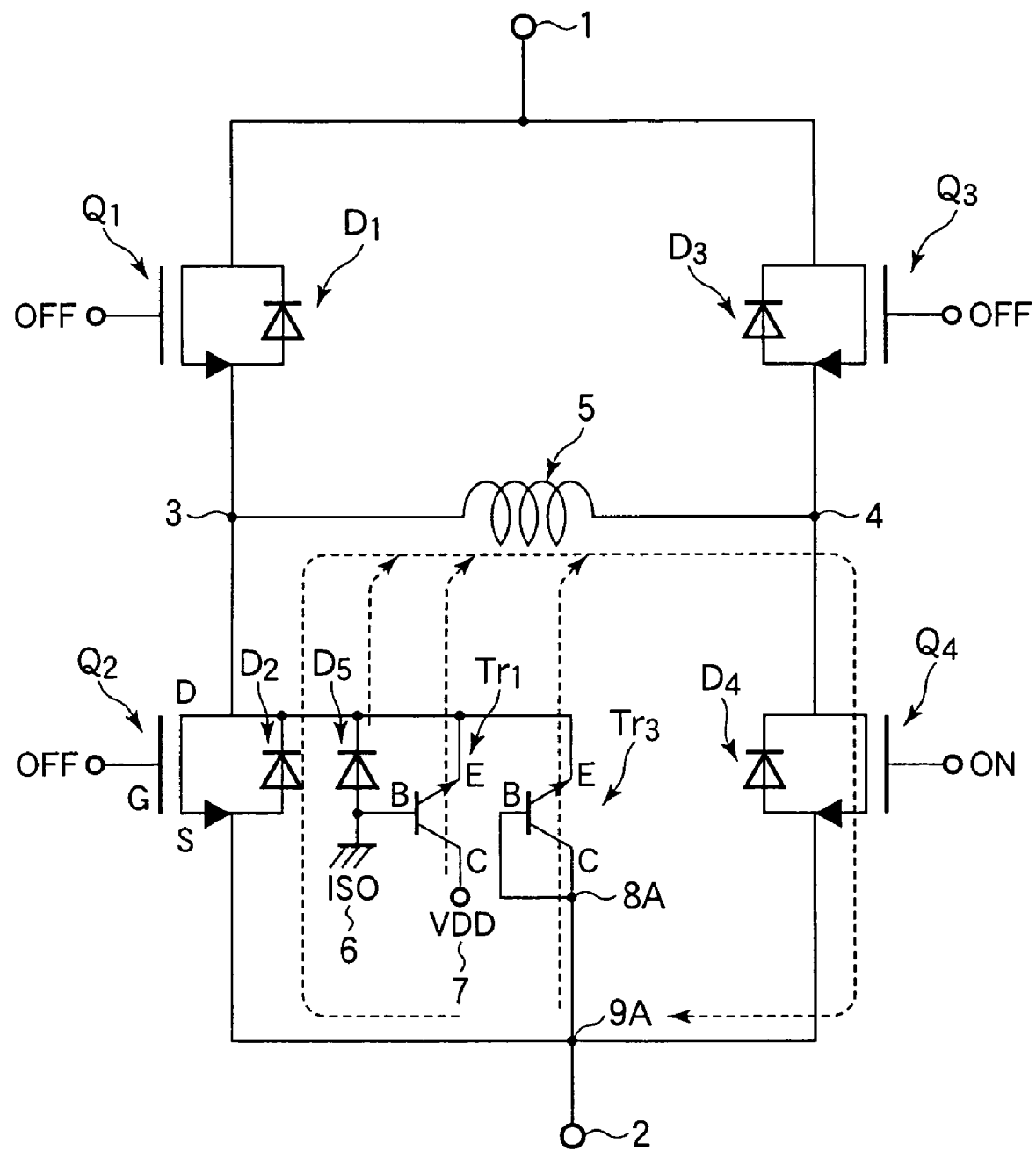
FIG. 14 is a circuit diagram showing the structure of an H-bridge circuit in a second embodiment of the invention.

Referring to FIG. 14, the H-bridge circuit in the second embodiment is similar to the basic H-bridge circuit shown in FIGS. 1 and 2 except that it includes a built-in npn transistor $Tr_3$.

This npn transistor $Tr_3$ is connected in parallel with the parasitic diode $D_2$ of lower-arm MOSFET $Q_2$. The base and collector of npn transistor $Tr_3$ are connected through nodes 8A and 9A to the source of MOSFET $Q_2$. The emitter of npn transistor $Tr_3$ is connected to the drain of MOSFET $Q_2$.

Figure 15:
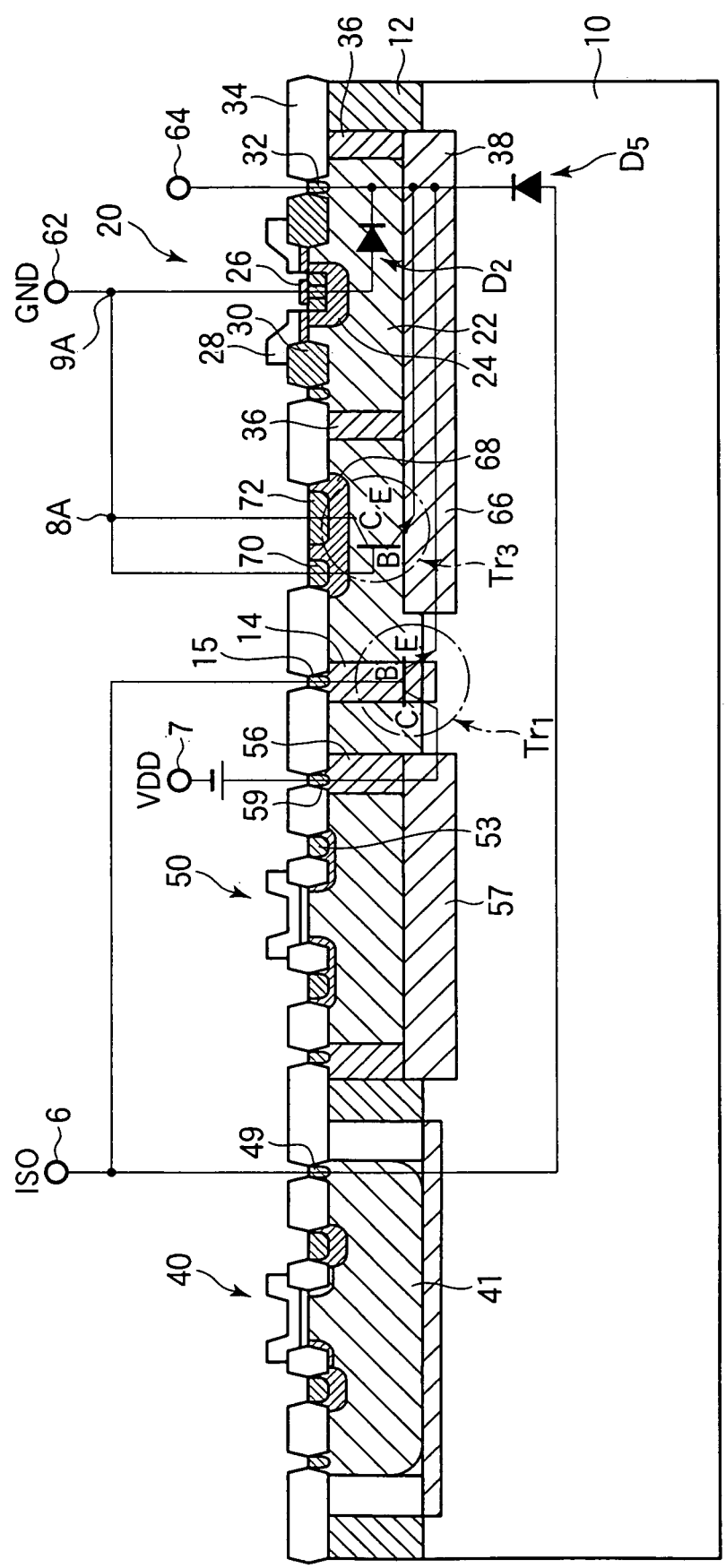
FIG. 15 is a schematic sectional view showing part of a pn junction isolated semiconductor integrated circuit including the H-bridge circuit in FIG. 14.

The lower-arm MOSFET $Q_2$ in FIG. 14 corresponds to the LDMOS transistor 20 in FIG. 15. The LDMOS transistor 20 in FIG. 15 has only one p-type isolation diffusion region 14. The structure in FIG. 15 differs from the basic structure shown in FIGS. 3 and 4 in that the built-in npn transistor $Tr_3$ is added between the LDMOS transistor 20 and the p-type isolation diffusion region 14.

The new npn transistor $Tr_3$ is formed in the n-type epitaxial layer 12 disposed on the p-type semiconductor substrate 10, between the p-type isolation diffusion region 14 and the adjacent n-type sinker 36 of LDMOS transistor 20. An n-type buried layer 66 extending above and below the interface between the p-type semiconductor substrate 10 and n-type epitaxial layer 12 is formed for pn junction isolation in the region in which npn transistor $Tr_3$ is formed. This n-type buried layer 66 forms an extension of the n-type buried layer 38 disposed below the LDMOS transistor 20.

The n-type buried layers 66, 38, the n-type drain region 22, and the n$^+$ drain diffusion region 32 collectively function as the emitter of npn transistor $Tr_3$. A p-type well 68 that functions as the base of npn transistor $Tr_3$ is formed at the surface of the part of the n-type epitaxial layer 12 above n-type buried layer 66. A p$^+$ diffusion region 70 is formed as a contact region in the p-type well 68. An n$^+$ diffusion region 72 that functions as the collector of npn transistor $Tr_3$ is formed at the surface of the p-type well 68. Since the p-type well 68 is formed in addition to the p-type isolation diffusion region 14, the device has a double diffusion structure analogous to the structure in the first embodiment. This structure may also be referred to as a double isolation structure, but the p$^+$ diffusion region 70 does not operate as an isolation element because it does not extend to the p-type semiconductor substrate 10.

The p-type well 68 that functions as the base is electrically connected by wiring to a node 8A through the p$^+$ diffusion region 70. The n$^+$ diffusion region 72 that functions as the collector is also electrically connected by wiring to node 8A. Node 8A is electrically connected by wiring to a node 9A disposed between the source diffusion region 26 and the source terminal 62 of the LDMOS transistor 20. The p-type well 68 (base) and n$^+$ diffusion region 72 (collector) of npn transistor $Tr_3$ (node 8A) are therefore at the same potential as the source terminal 62 of LDMOS transistor 20 (node 9A).

Regenerative current occurs when the gate signal of MOSFET $Q_1$ is switched from the on state to the off state, as shown in FIG. 14. Because of the regenerative current, the drain of n-channel MOSFET $Q_2$ is biased to a negative voltage. As in the basic H-bridge circuit (see FIG. 5), current flows through parasitic diodes $D_2$ and $D_5$.

Accordingly, the parasitic npn transistor $Tr_1$ having the n-type drain region 22, n$^+$ drain diffusion region 32, and n-type buried layers 38, 66 in FIG. 15 as its emitter, the p-type isolation diffusion region 14 as its base, and the n-type sinker 56, n-type buried layer 57, and n$^+$ diffusion region 59 of the high-voltage p-channel MOSFET 50 as its collector turns and supplies current through the drain of LDMOS transistor 20 to node 3.

In addition, the new built-in npn transistor $Tr_3$ having the p-type well 68 as its base, the n$^+$ diffusion region 72 as its collector, and the n-type epitaxial layer 12 as its emitter turns on, also supplying current through the drain of LDMOS transistor 20 to node 3.

The built-in npn transistor $Tr_3$ has a narrower base width and a greater current gain ($h_{FE}$) than parasitic npn transistor $Tr_1$, and can therefore take over a greater share of the total drain current. The drain current routed through npn transistor $Tr_3$ decreases the amount of current drawn from the isolation terminal 6 or power supply terminal 7 through the peripheral circuits, thereby preventing malfunctions of the peripheral circuits.

Since its base and collector are interconnected at node 8A, npn transistor $Tr_3$ operates like a diode, conducting current only when its emitter is at a lower potential than its collector. The emitter of npn transistor $Tr_3$ is connected to the drain of LDMOS transistor 20, and the collector of npn transistor $Tr_3$ is connected through nodes 8A and 9A to the source of LDMOS transistor 20. Normally, the drain potential of LDMOS transistor 20 is equal to or higher than the source potential of LDMOS transistor 20, so npn transistor $Tr_3$ is switched off and does not interfere with normal operation.

During normal operation, however, the drain of LDMOS transistor 20 may be raised to a high positive voltage, so the emitter-base junction of npn transistor T3 must have a high breakdown voltage under reverse bias. In addition, npn transistor $Tr_3$ should have a high current gain under forward bias (reverse $h_{FE}$ of a normal npn transistor) to increase the current it can supply in its diode-connected configuration.

In the first embodiment, the $h_{FE}$ value of parasitic npn transistor $Tr_2$ is typically 0.1 or less. The reverse $h_{FE}$ value of npn transistor $Tr_3$ is about 10, which is two orders of magnitude greater, because of the specially formed base diffusion region 68. Therefore, npn transistor $Tr_3$ functions effectively as a current source.

As described above, the H-bridge circuit in the second embodiment has a new built-in npn transistor $Tr_3$ connected in parallel with the parasitic diode $D_2$ of lower-arm n-channel MOSFET $Q_2$. The base and collector of npn transistor $Tr_3$ are connected to the source of MOSFET $Q_2$; the emitter of npn transistor $Tr_3$ is connected to the drain of MOSFET $Q_2$.

With this configuration, even if the LDMOS drain is negatively biased by the regenerative current that occurs when MOSFET $Q_1$ is switched off, the built-in npn transistor connected turns on and establishes a conductive path between the LDMOS source and drain, in parallel with the LDMOS parasitic diode path. Conduction of current through the built-in npn transistor reduces the current drawn from peripheral circuits. Therefore, when MOSFET $Q_1$ is switched off, the effect of the resulting regenerative current on the peripheral circuits is reduced, as compared with the conventional basic H-bridge circuit.

Another feature of the second embodiment is that it only requires additional p-type and n-type regions, making it simpler than improved H-bridge structures that require additional dielectric isolation structures.

Third Embodiment

Figure 16:
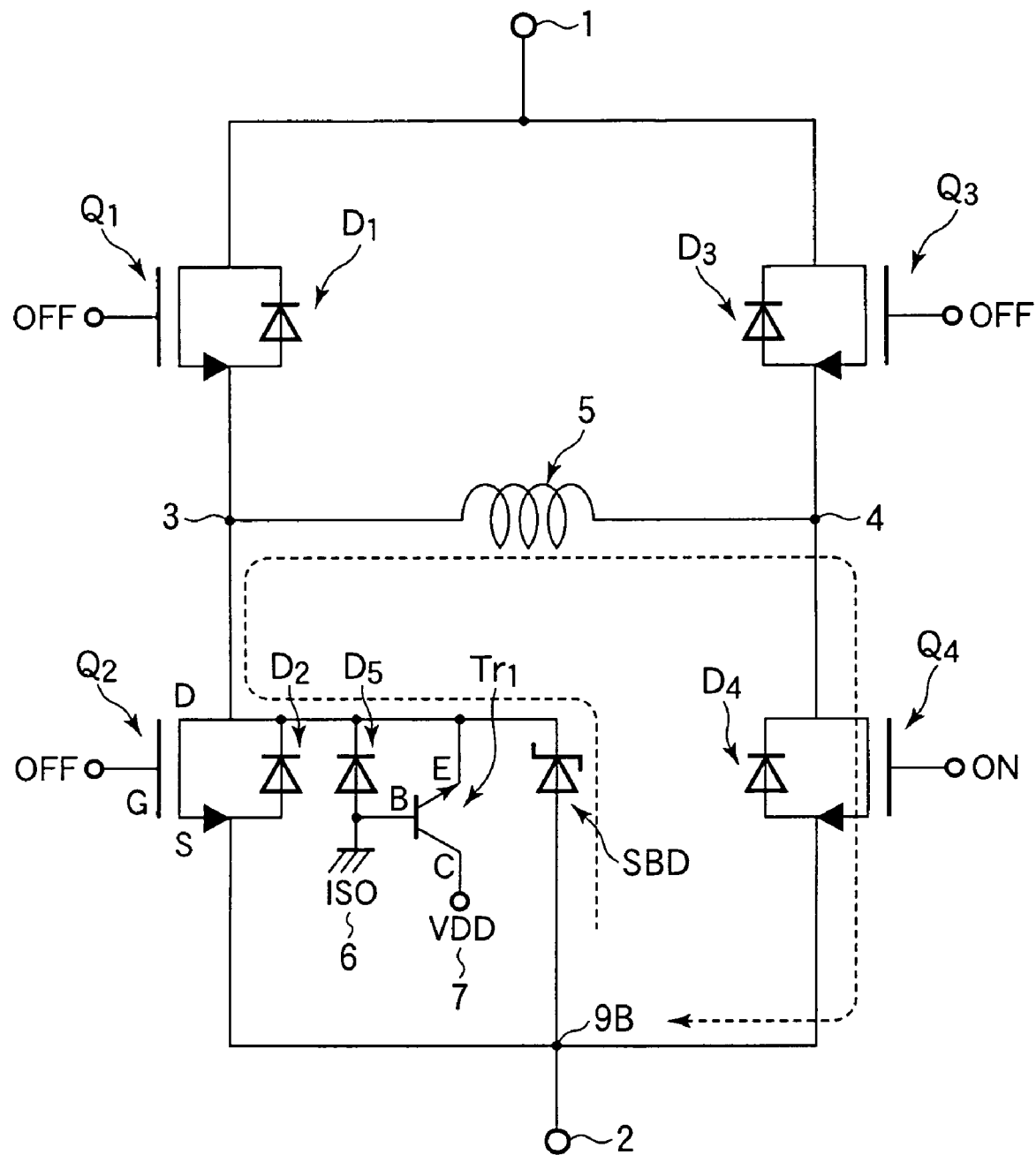
FIG. 16 is a circuit diagram showing the structure of an H-bridge circuit in a third embodiment of the invention.

Referring to FIG. 16, the H-bridge circuit in the third embodiment is similar to the basic H-bridge circuit shown in FIGS. 1 and 2 except that it includes a built-in Schottky (barrier) diode SBD.

The built-in Schottky diode SBD is connected in parallel with the parasitic diode $D_2$ of lower-arm n-channel MOSFET $Q_2$. The anode of the Schottky diode SBD is connected through a node 9B to the source of MOSFET $Q_2$. The cathode of the Schottky diode SBD is connected to the drain of MOSFET $Q_2$.

Figure 17:
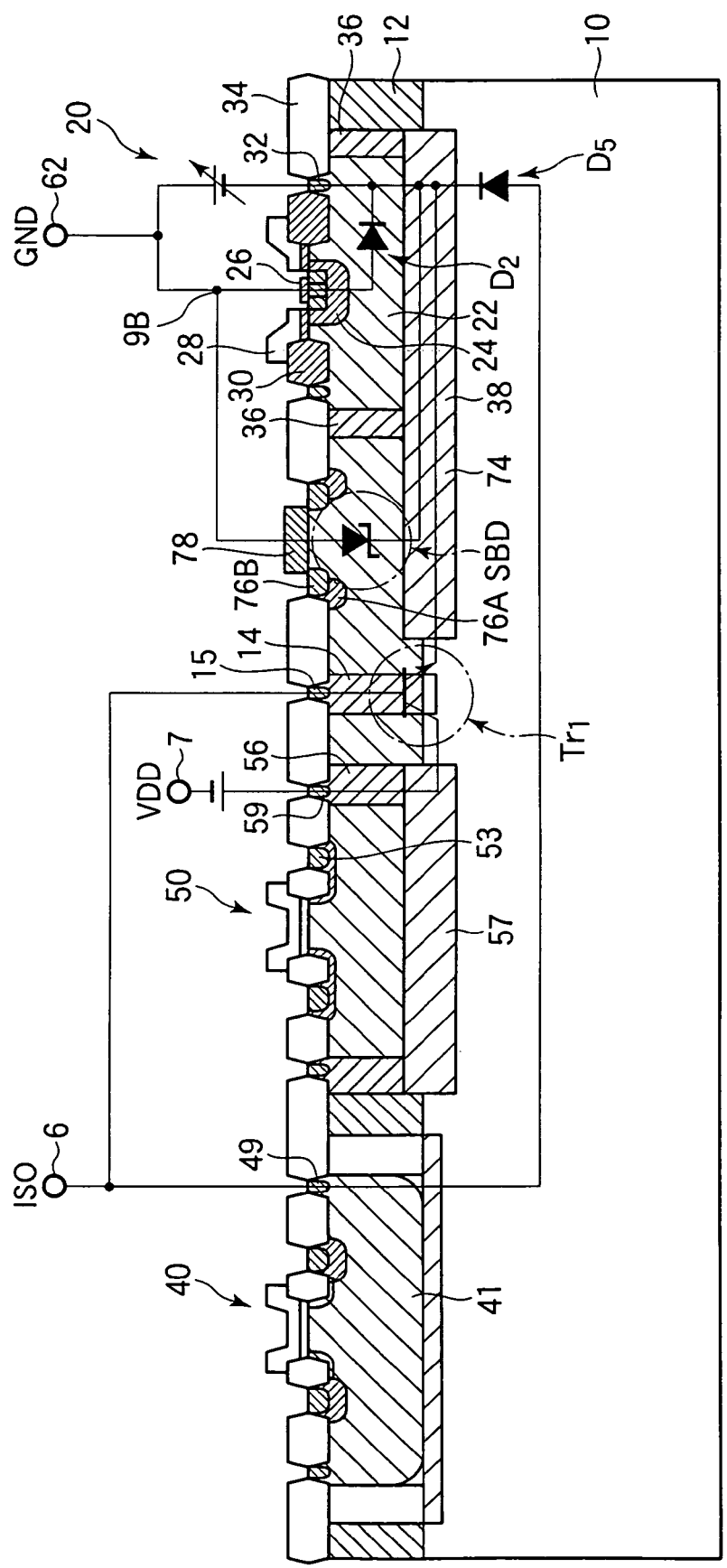
FIG. 17 is a schematic sectional view showing part of a pn junction isolated semiconductor integrated circuit including the H-bridge circuit in FIG. 16.

The lower-arm MOSFET $Q_2$ in FIG. 16 corresponds to the LDMOS transistor 20 in FIG. 17. As in the basic structure shown in FIG. 3, the LDMOS transistor 20 in FIG. 15 has only one p-type isolation diffusion region 14, but the new Schottky diode SBD is present between the LDMOS transistor 20 and the p-type isolation diffusion region 14.

The Schottky diode SBD is formed in the n-type epitaxial layer 12 formed on the p-type semiconductor substrate 10, between the p-type isolation diffusion region 14 and the adjacent n-type sinker 36 of the LDMOS transistor 20, and between the LDMOS transistor 20 and the peripheral circuits 40, 50. An n-type buried layer 74 extending above and below the interface between the p-type semiconductor substrate 10 and n-type epitaxial layer 12 is formed for pn junction isolation in the region in which Schottky diode SBD is formed. The n-type epitaxial layer 12 above the n-type buried layer 74, the n-type buried layers 74, 38, the n-type drain region 22, and the n⁺ drain diffusion region 32 collectively function as the cathode of the Schottky diode SBD. A p⁻ diffusion region 76A and a p⁺ diffusion region 76B that function as contact layers are formed at the surface of the part of the n-type epitaxial layer 12 above n-type buried layer 74. A gold film 78 that functions as the anode of the Schottky diode SBD is formed on the surface of the n-type epitaxial layer 12, partly in contact with the p⁺ diffusion region 76B. Since the p⁻ diffusion region 76A and 76B are formed in addition to the p-type isolation diffusion region 14, the device has a double diffusion structure analogous to the structures in the first and second embodiments.

The gold film 78 (anode) is electrically connected by wiring to a node 9B between the source diffusion region 26 and source terminal 62. The anode of the Schottky diode SBD is therefore at the same potential as the source terminal of the LDMOS transistor 20, in this case, the potential of node 9B, which is at the same potential as the source terminal 62 and ground terminal 2.

Regenerative current occurs when the gate signal of MOSFET $Q_1$ is switched from the on state to the off state, as shown in FIG. 16. Because of the regenerative current, the drain of n-channel MOSFET $Q_2$ is biased to a negative voltage, so parasitic diodes $D_2$ and $D_5$ become forward biased. If the forward bias is high enough, parasitic diodes $D_2$ and $D_5$ conduct current as in the basic H-bridge circuit (FIG. 5).

As a result of this parasitic current, the parasitic npn transistor $Tr_1$ having the n-type drain region 22, n⁺ drain diffusion region 32, and n-type buried layer 38 as its emitter, p-type isolation region 14 as its base, and the n-type sinker 56, n-type buried layer 57, and n⁺ diffusion region 59 of the high-voltage p-channel MOSFET 50 as its collector turns on and supplies further current through the drain of LDMOS transistor 20 to node 3.

In the structure shown in FIGS. 16 and 17, the Schottky diode SBD having the gold film 78 as its anode and the n-type epitaxial layer 12 as its cathode also turns on and supplies current through the drain of LDMOS transistor 20 to node 3.

Figure 18:
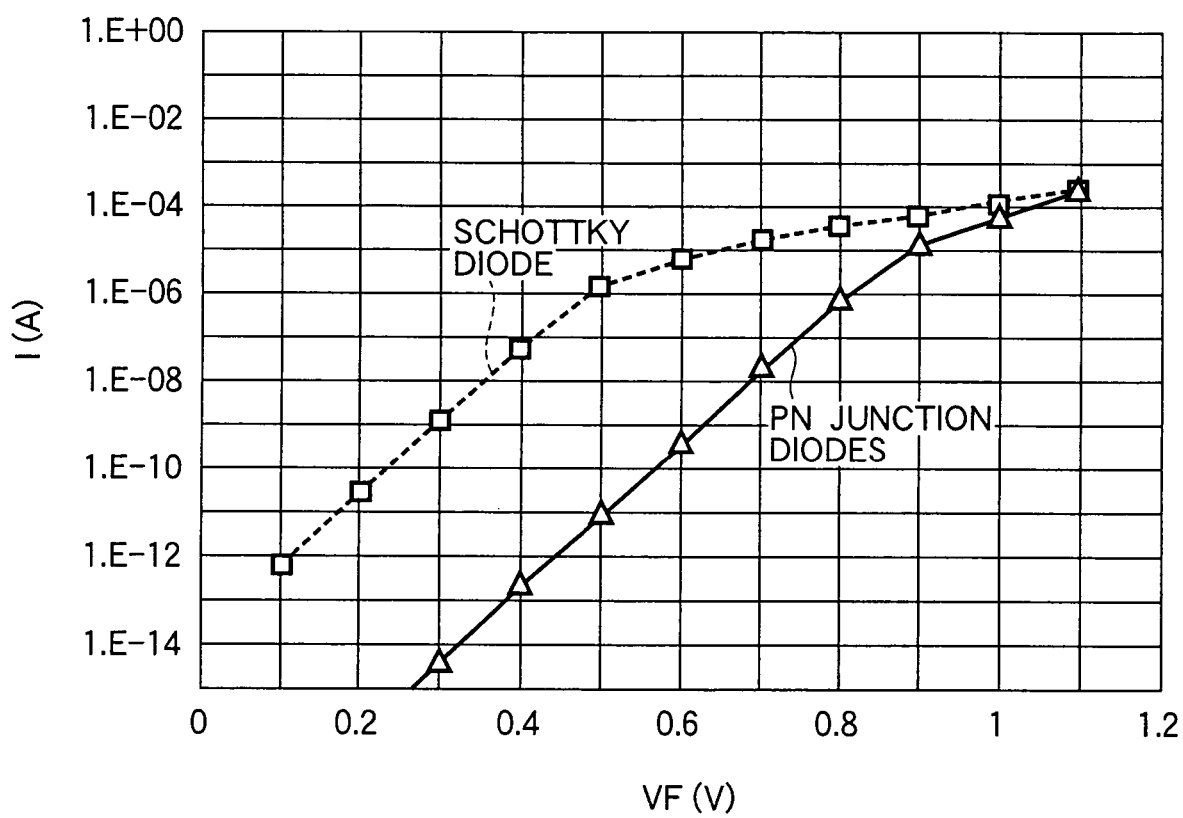
FIG. 18 is a graph showing the voltage-current characteristics of a Schottky diode and an ordinary pn junction diode.

The voltage-current characteristics of the Schottky diode SBD and the parasitic diodes $D_2$ and $D_5$, which are pn junction diodes, are shown in FIG. 18. The horizontal axis represents the forward bias voltage VF (in volts) of the diodes. The vertical axis represents the logarithm of forward current I in amperes (A). The Schottky diode SBD has an area of one square micrometer (1 μm²). As the curves in FIG. 18 indicate, the Schottky diode has a lower turn-on voltage than the pn junction diodes.

When the drain of MOSFET $Q_2$ becomes negatively biased, accordingly, the Schottky diode SBD turns on and starts supplying drain current from the source terminal 62 before parasitic diode $D_5$ turns on and supplies current from the isolation terminal 6. By slowing the rise of the negative drain bias, this delays the turn-on of parasitic diode $D_5$ and parasitic npn transistor $Tr_1$. Altogether, the amount of current drawn from the isolation terminal 6 and power supply terminal 7 through the peripheral circuits and parasitic elements $D_5$ and $Tr_1$ is reduced, preventing malfunction of the peripheral circuits.

As the forward bias of the Schottky diode SBD increases, so does the voltage drop caused by the series resistance of the part of the n-type epitaxial layer 12 functioning as the cathode of Schottky diode SBD, and the current flow through the Schottky diode SBD begins to saturate. At forward bias voltages below about 0.8 V, however, the Schottky diode SBD conducts considerably more current than parasitic diode $D_5$.

As described above, the H-bridge circuit in the third embodiment has a built-in Schottky diode SBD connected in parallel with the parasitic diode $D_2$ of lower-arm n-channel MOSFET $Q_2$. The anode of Schottky diode SBD is connected to the source of MOSFET $Q_2$; the cathode of Schottky diode SBD is connected to the drain of MOSFET $Q_2$.

With this configuration, if the LDMOS drain is negatively biased by the regenerative current that occurs when MOSFET $Q_1$ is switched off, the built-in Schottky diode SBD turns on before the LDMOS parasitic diodes, establishing a conductive path between the LDMOS source and drain, supplying current to the drain, thus slowing the rate at which the negative bias of the LDMOS drain deepens, thereby delaying the rise of parasitic diode current. The delay of the parasitic diode current delays the turn-on of the parasitic npn transistor $Tr_1$. As a result, less current is drawn from the peripheral circuits, so the effect of the regenerative current on the peripheral circuits is reduced significantly, in comparison with the basic H-bridge circuit.

Another feature of the third embodiment is that it requires only the addition of a p-type region, an n-type region, and a metal layer, making it simpler than improved H-bridge structures that require additional dielectric isolation structures.

Fourth Embodiment

Figure 19:
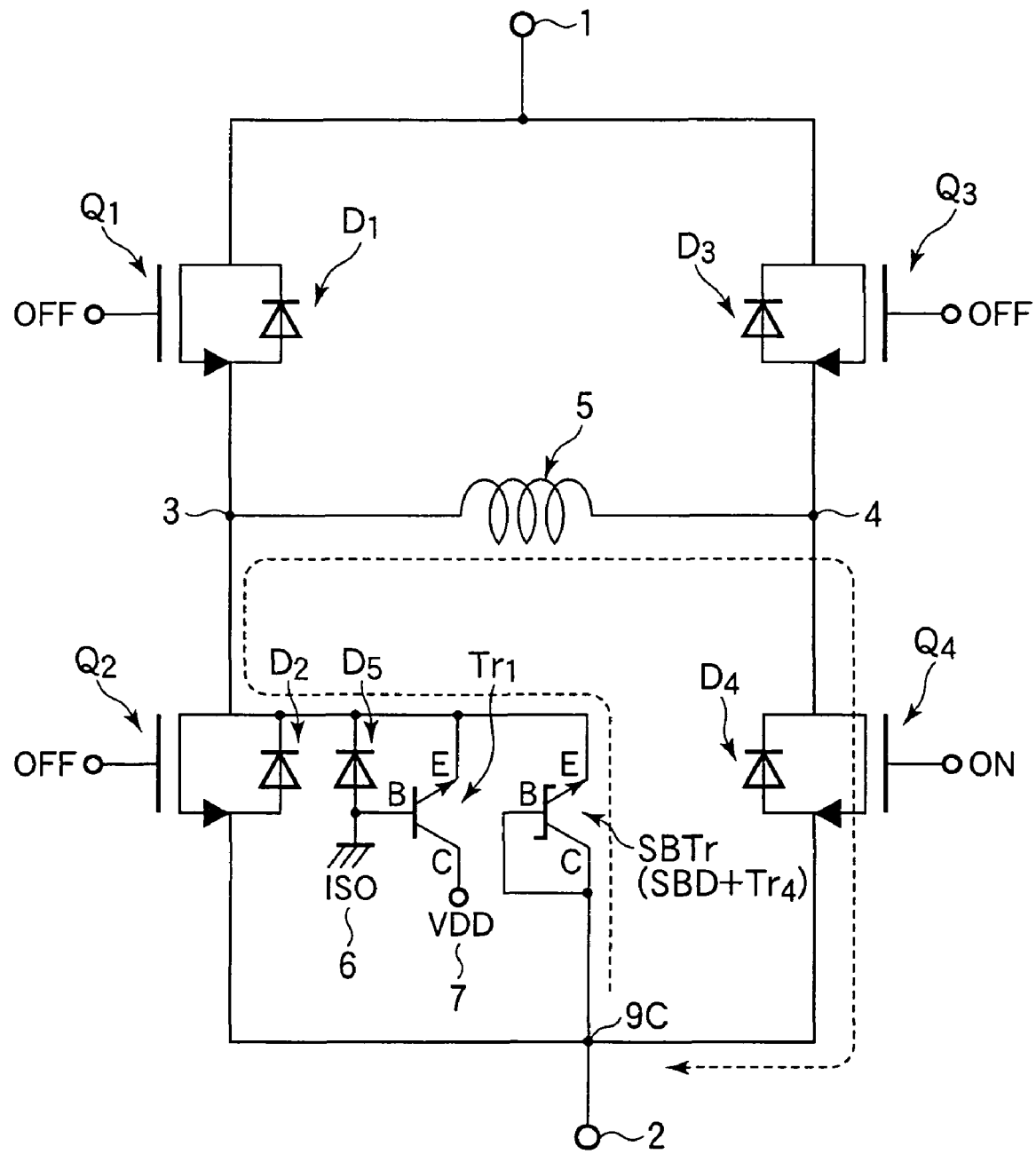
FIG. 19 is a circuit diagram showing the structure of an H-bridge circuit in a fourth embodiment of the invention.

Referring to FIG. 19, the H-bridge circuit in the fourth embodiment is similar to the basic H-bridge circuit shown in FIGS. 1 and 2 except that it includes a built-in Schottky (barrier) transistor.

The Schottky transistor SBTr is connected in parallel with the parasitic diode $D_2$ of lower-arm n-channel MOSFET $Q_2$.

Schottky transistor SBTr is a combination of a Schottky diode SBD and an npn transistor $Tr_4$.

As in the third embodiment, the anode of the Schottky diode SBD is connected through a node 9C to the source of MOSFET $Q_2$. The cathode of Schottky diode SBD is connected to the drain of MOSFET $Q_2$. The base and collector of npn transistor $Tr_4$ are connected through node 9C to the source of MOSFET $Q_2$. The emitter of npn transistor $Tr_4$ is connected to the drain of MOSFET $Q_2$.

Figure 20:
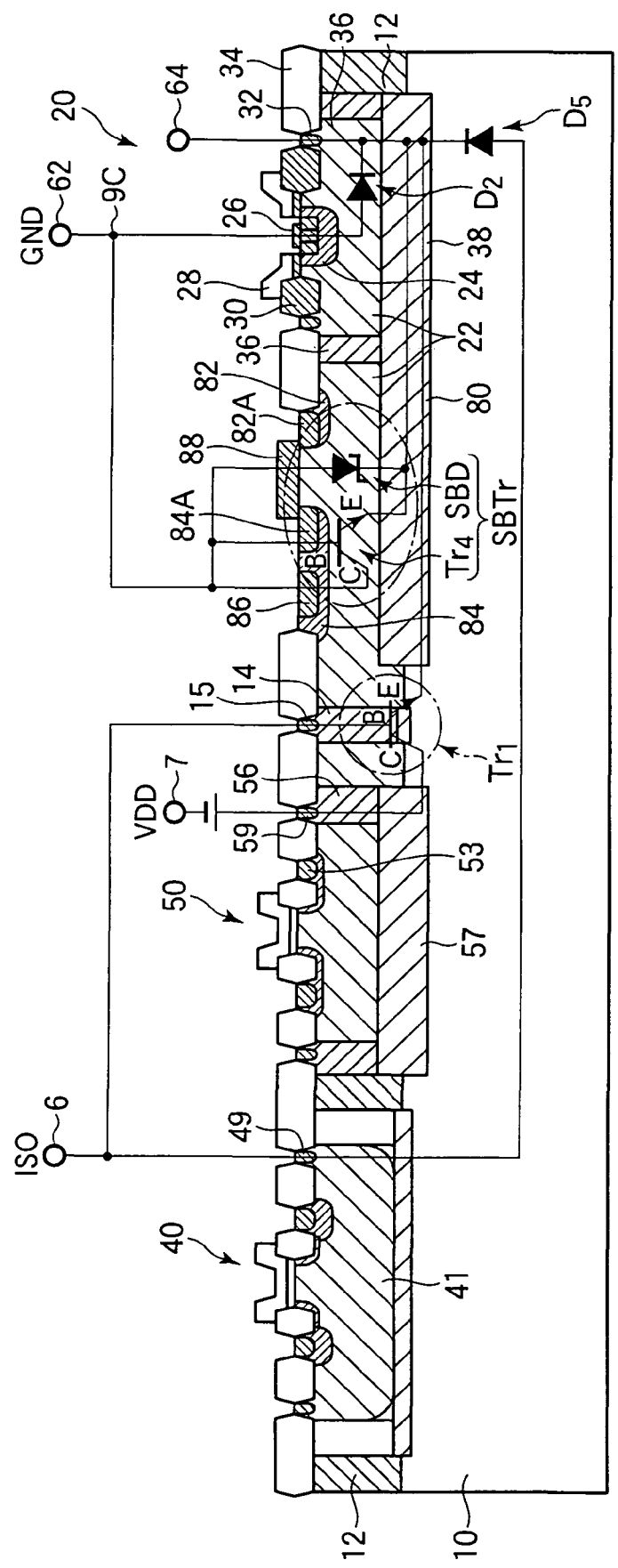
FIG. 20 is a schematic sectional view showing part of a pn junction isolated semiconductor integrated circuit including the H-bridge circuit in FIG. 19.

The lower-arm MOSFET $Q_2$ in FIG. 19 corresponds to the LDMOS transistor 20 in FIG. 20. The structure in FIG. 20 differs from the basic structure shown in FIGS. 3 and 4 in that the Schottky transistor SBTr is present between the LDMOS transistor 20 and the p-type isolation diffusion region 14.

The Schottky transistor SBTr is formed in the n-type epitaxial layer 12 disposed on the p-type semiconductor substrate 10, between the p-type isolation diffusion region 14 and the adjacent n-type sinker 36 of the LDMOS transistor 20, and between the LDMOS transistor 20 and the peripheral circuits 40, 50. An n-type buried layer 80 extending above and below the interface between the p-type semiconductor substrate 10 and n-type epitaxial layer 12 is formed for pn junction isolation in the region in which the Schottky transistor SBTr is formed. This n-type buried layer 80 is an extension of the n-type buried layer 38 of the LDMOS transistor 20. The n-type buried layers 80, 38, the n-type epitaxial layer 12 above the n-type buried layer 80, the n-type drain region 22, and the n+ drain diffusion region 32 collectively function as the cathode of the Schottky diode SBD. A p+ diffusion region 82A and p− diffusion region 82 that function as contact layers are formed at the surface of the n-type epitaxial layer 12.

The regions that function as the cathode of the Schottky diode SBD also function as the emitter of the npn transistor $Tr_4$. A p-type well 84 that functions as the base of the npn transistor $Tr_4$ is formed at the surface of the n-type epitaxial layer 12. A p+ diffusion region 84A is formed in the surface of the p-type well 84 as a contact region. An n+ diffusion region 86 that function as the collector of the npn transistor $Tr_4$ is also formed in the surface of the p-type well 84. A gold film 88 that functions as the anode of Schottky diode SBD is formed on the surface of the n-type epitaxial layer 12, partly in contact with the p+ diffusion regions 82A and 84A.

The anode gold film 88 is electrically connected by wiring to a node 9C between the source diffusion region 26 and source terminal 62 of the LDMOS transistor 20. The gold film 88 (anode) of the Schottky diode SBD is therefore at the same potential as the source terminal of the LDMOS transistor 20, in this case, the potential of node 9C.

The p-type well 84 that functions as the base of npn transistor $Tr_4$ is electrically connected by wiring making electrical contact with the p+ diffusion region 84A to this same node 9C. The n+ diffusion region 86 that functions as the collector of npn transistor $Tr_4$ is also electrically connected by wiring to node 9C. The p-type well 84 (base) and n+ diffusion region 86 (collector) of npn transistor $Tr_4$ are therefore at the same potential as the source terminal 62 of the LDMOS transistor 20 (node 9C).

With the connections shown in FIG. 20, when the drain of LDMOS transistor 20 is negatively biased with respect to the source of LDMOS transistor 20, so that the Schottky diode SBD is forward biased, the Schottky diode SBD quickly turns on and begins supplying current to the drain of LDMOS transistor 20. Base current also begins flowing into the p-type well 84 of npn-transistor $Tr_4$. When the forward bias voltage increases to such a level that npn transistor $Tr_4$ turns on, a collector current $h_{FE}$ times as great as the base current begins to flow through the n-type epitaxial layer 12 to the drain of the LDMOS transistor 20.

In the fourth embodiment, when the drain of MOSFET $Q_2$ is negatively biased, before parasitic pn junction diode $D_5$ turns on, the Schottky diode SBD turns on, slowing the increase of the negative bias, thereby delaying the turn-on of parasitic diode $D_5$ and consequently delaying the turn-on of parasitic npn transistor $Tr_1$. As in the third embodiment, this reduces the amount of current drawn from the isolation terminal 6 and power supply terminal 7 through the peripheral circuits.

In time, parasitic diode $D_5$ and parasitic npn transistor $Tr_1$ turn on, but so does the built-in npn transistor $Tr_4$. The parasitic diode $D_5$ and parasitic npn transistor $Tr_1$ must now compete for drain current with both the Schottky diode SBD and npn transistor $Tr_4$. The built-in npn transistor $Tr_4$, like the built-in npn transistor $Tr_1$ in the second embodiment, diverts a particularly large amount of current away from parasitic diode $D_5$ and parasitic npn transistor $Tr_1$. The flow of parasitic current through the peripheral circuits decreases accordingly.

As described above, the H-bridge circuit in the fourth embodiment has a built-in Schottky transistor SBTr connected in parallel with the parasitic diode $D_2$ of lower-arm re-channel MOSFET $Q_2$. The built-in Schottky transistor SBTr includes a Schottky diode SBD having its anode connected to the source of MOSFET $Q_2$ and its cathode connected to the drain of MOSFET $Q_2$, and an npn transistor $Tr_4$ having its base and collector connected to the source of MOSFET $Q_2$ and its emitter connected to the drain of MOSFET $Q_2$.

With this configuration, if the drain of MOSFET $Q_2$ is negatively biased by regenerative current when MOSFET $Q_1$ is switched off, first the Schottky diode SBD turns on, delaying the turn-on of parasitic elements, and then the npn transistor $Tr_4$ turns on, providing a path that can conduct more current to the drain of MOSFET $Q_2$ than the can the parasitic paths leading through peripheral circuits.

Although not shown in the drawings, the fourth embodiment provides a similar Schottky transistor for MOSFET $Q_4$, with similar effects.

The fourth embodiment combines the features of the second and third embodiments. The effect on the peripheral circuits of the regenerative current due to MOSFET switching is reduced significantly, in comparison with the basic H-bridge circuit.

Like the third embodiment, the fourth embodiment requires only the addition of p-type and n-type diffusion regions and a metal layer, making it simpler than conventional improved H-bridge structures that require additional dielectric isolation structures.

Figure 21:
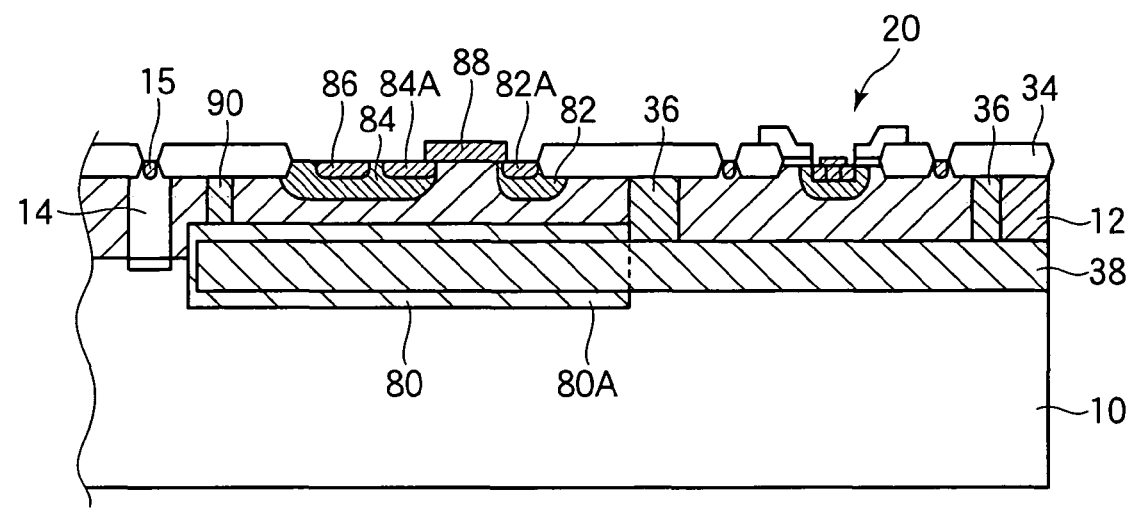
FIGS. 21 and 22 are sectional views illustrating variations of the fourth embodiment.

In the third and fourth embodiments, an n-type buried layer is formed for pn junction isolation in the region in which the Schottky diode or Schottky transistor is formed. To decrease the resistance of the n-type epitaxial region formed in series with the Schottky junction, the n-type buried layer is preferably surrounded by a low-concentration n-type diffusion region. For example, in the fourth embodiment, an n− diffusion region 80A formed by diffusing an n-type impurity at a low concentration be formed around the n-type buried layer 80 as shown in FIG. 21. A n-type sinker 90, which was not shown in FIG. 20, extends through the n-type epitaxial layer 12 to the n-type buried layer 80; the Schottky transistor is formed between this n-type sinker 90 and the adjacent n-type sinker 36 forming part of the LDMOS transistor 20.

Figure 22:
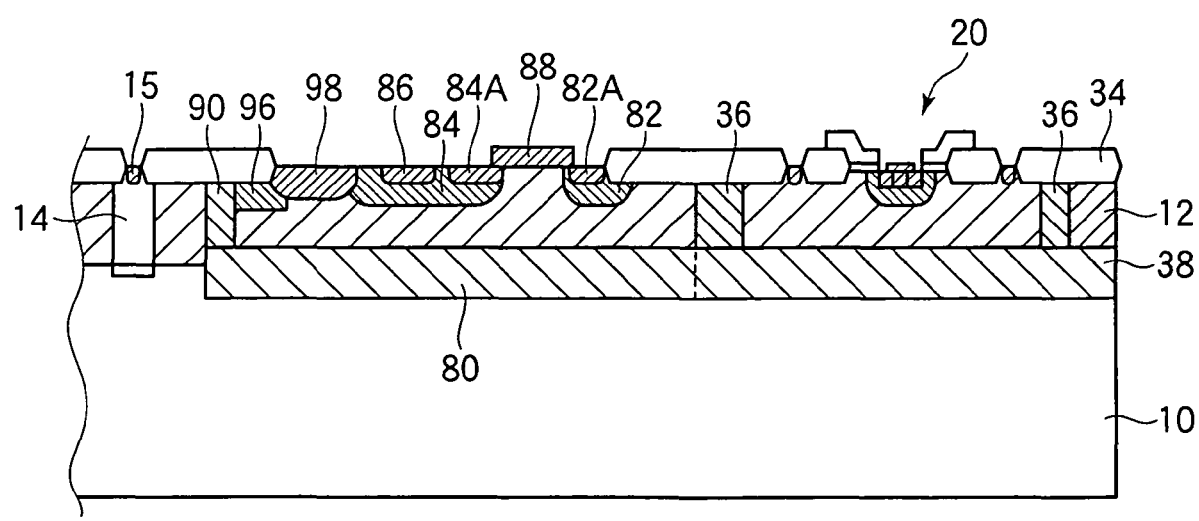

To prevent electrostatic damage during handling and assembly, the output terminals are preferably protected by intentionally forming a pn junction having a lower breakdown voltage than the LDMOS drain at a suitable point in the integrated circuit. In the fourth embodiment, for example, an n-type tub 96 and an adjacent p-type body diffusion region 98 may be formed at the surface of the n-type epitaxial layer 12 between the Schottky transistor and the n-type sinker 90, as shown in FIG. 22.

Fifth Embodiment

The H-bridge circuit in the fifth embodiment is generally similar to the H-bridge circuit in the fourth embodiment shown in FIGS. 19 and 20, but differs in providing dielectric isolation between the lower-arm LDMOS transistors (MOSFETs $Q_2$ and $Q_4$) and the peripheral circuits, instead of relying solely on pn junction isolation. Specifically, the p-type isolation diffusion region is replaced with an oxide structure. Consequently, the parasitic npn transistor $Tr_1$ that was present in the preceding embodiments is absent in the fifth embodiment.

Figure 23:
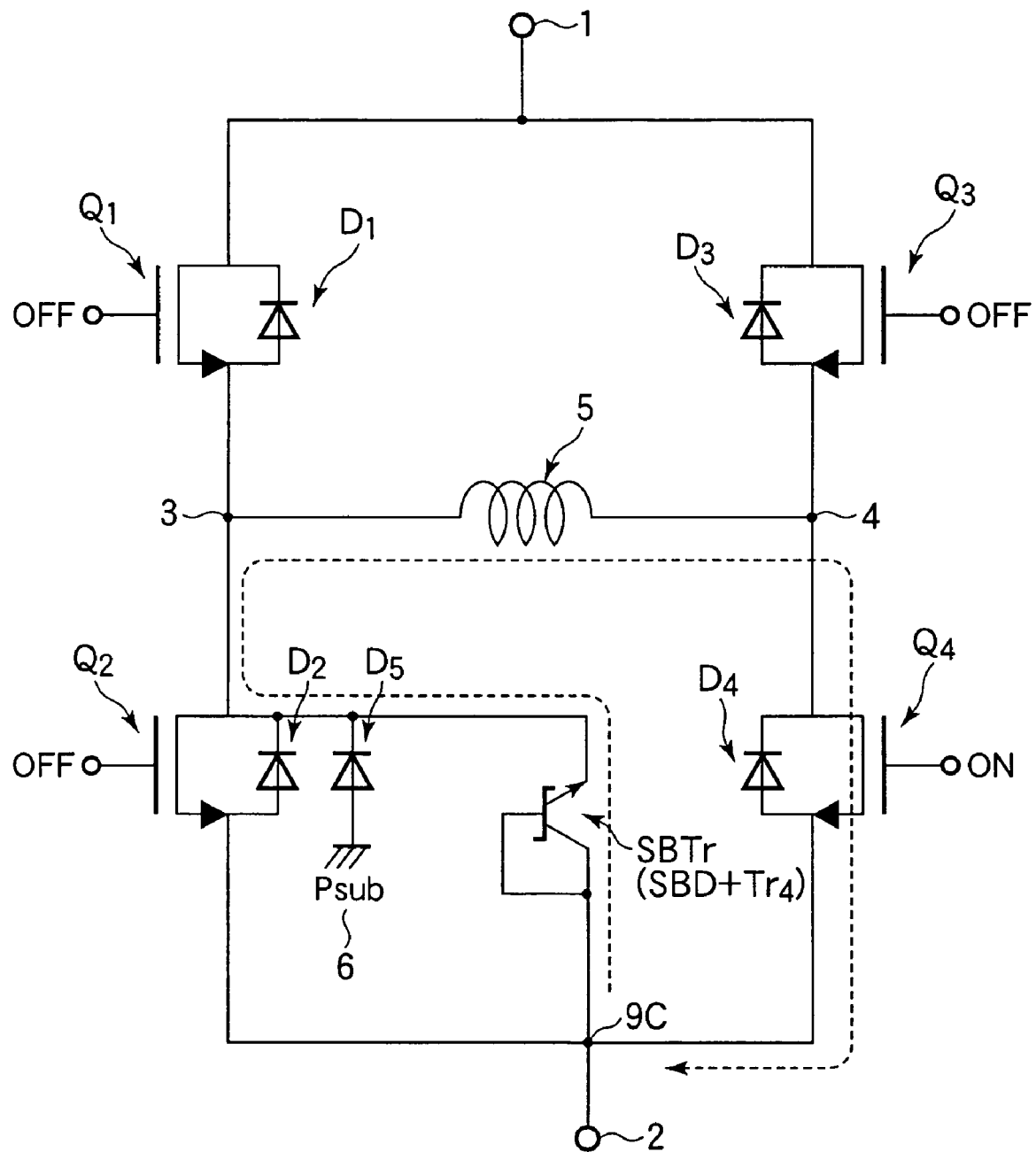
FIG. 23 is a circuit diagram showing the structure of an H-bridge circuit in a fifth embodiment of the invention.

Referring to FIG. 23, the H-bridge circuit in the fifth embodiment has a Schottky transistor SBTr including a Schottky diode SBD and an npn transistor $Tr_4$ connected in the same way as in the fourth embodiment, in parallel with parasitic diode $D_2$ of lower-arm n-channel MOSFET $Q_2$. The anode of the Schottky diode SBD is connected through node 9C to the source of MOSFET $Q_2$. The cathode of Schottky diode SBD is connected to the drain of MOSFET $Q_2$. The base and collector of npn transistor $Tr_4$ are connected through node 9C to the source of MOSFET $Q_2$. The emitter of npn transistor $Tr_4$ is connected to the drain of MOSFET $Q_2$.

A similar Schottky transistor (not shown) is provided for MOSFET Q.

Figure 24:
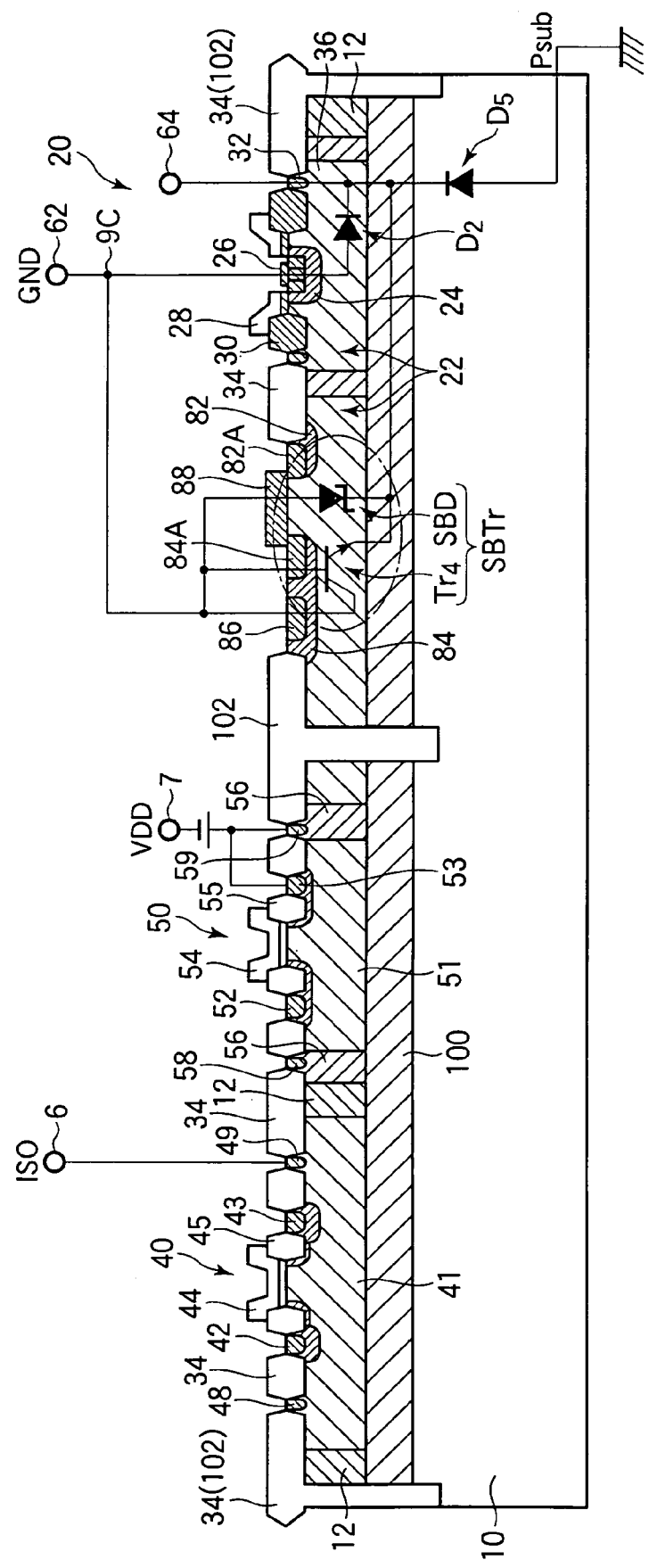
FIG. 24 is a schematic sectional view showing part of an oxide isolated semiconductor integrated circuit including the H-bridge circuit in FIG. 23.

Referring to FIG. 24, the motor control semiconductor integrated circuit in the fifth embodiment employs both pn junction isolation, provided by an n-type buried layer 100 extending above and below the interface between the p-type semiconductor substrate 10 and n-type epitaxial layer 12, and dielectric isolation, provided by oxide regions 102.

In the preceding embodiments, each circuit element had a separate buried layer of the appropriate conductive type. In the fourth embodiment, for example, as shown in FIG. 20, the LDMOS transistor 20 had an n-type buried layer 38, the Schottky transistor SBTr had an n-type buried layer 80, the high-voltage p-channel MOSFET 50 had an n-type buried layer 57, and the high-voltage n-channel MOSFET 40 had a p-type buried layer 47. In the fifth embodiment, these separate buried layers are replaced by the single n-type buried layer 100, which is shared by the LDMOS transistor 20, Schottky transistor SBTr, and high-voltage MOSFETs 40 and 50 as shown in FIG. 24.

The replacement of the p-type buried layer 47 of the high-voltage n-channel MOSFET 40 with the n-type buried layer 100 changes the structure of the high-voltage n-channel MOSFET 40. Since the high-voltage n-channel MOSFET 40 lacks a p-type buried layer, it also lacks the p-type sinkers that were present in the preceding embodiments. As shown in FIG. 24, the p-type well 41 of the high-voltage re-channel MOSFET 40 in the fifth embodiment is formed in the n-type epitaxial layer 12, part of which remains as n-type regions at the periphery of MOSFET 40.

The oxide regions 102 in the fifth embodiment replace the p-type isolation diffusion region and some of the field oxide regions 34 in the preceding embodiments. One oxide region 102 is located between the Schottky transistor SBTr and the high-voltage p-channel MOSFET 50. This oxide region 102, shown approximately in the center of FIG. 24, includes a surface oxide layer disposed at the surface of the n-type epitaxial layer 12 and a trench oxide layer penetrating from the surface oxide layer through the n-type epitaxial layer 12 and n-type buried layer 100 and extending into the p-type semiconductor substrate 10 below the n-type buried layer 100. The surface oxide layer isolates adjacent elements at the surface of the n-type epitaxial layer 12. The trench oxide layer extends this isolation through the entire depth of the n-type epitaxial layer 12.

Similar oxide regions 102 are provided at the right and left ends of FIG. 24, creating an isolated island region that includes the LDMOS transistor 20 and Schottky transistor SBTr, and another isolated island region that includes the high-voltage MOSFETs 40 and 50.

As in the preceding embodiments, regenerative current occurs when the gate signal of the LDMOS transistor 20 (MOSFET $Q_1$ in FIG. 23) is switched from the on state to the off state. Because of the regenerative current, the drain of n-channel MOSFET $Q_2$ is biased to a negative voltage. The n-type drain region 22 and $n^+$ drain diffusion region 32 that function as the drain of MOSFET $Q_2$ (LDMOS transistor 20) in FIG. 24 and the conductive n-type sinkers 36 and n-type buried layer 100 connected to them are placed at a negative potential with respect to the p-type semiconductor substrate 10.

The negative potential of these n-type regions creates a forward bias between the p-type body diffusion region 24 and $n^+$ drain diffusion region 32 in the LDMOS transistor 20, turning on parasitic diode $D_2$ of MOSFET $Q_2$. When die-bonded on the lead frame, the p-type semiconductor substrate 10 is placed at the lowest potential of the chip (indicated as Psub and by the ground symbol in FIG. 24) by connection to an isolation potential through external wiring, but the negative potential of the above n-type regions also creates a forward bias between them and the p-type semiconductor substrate 10, turning on parasitic diode $D_5$. Current flows through both parasitic diodes $D_2$ and $D_5$ into the drain of the LDMOS transistor 20.

The flow of current from the p-type semiconductor substrate 10 into the drain of the LDMOS transistor 20 creates potential differences in the p-type semiconductor substrate 10 and partially raises the p-type semiconductor substrate 10 above its normal potential (Psub). The potential changes are also transmitted to the external wiring connected to the p-type semiconductor substrate 10, and thereby to other circuits (not shown) mounted on the same circuit board and connected to the same wiring, creating a type of electrical noise generally referred to as ground bounce. Such noise can induce the formation of parasitic elements in the other circuits and cause them to latch up or otherwise malfunction.

Disturbances in the potential of the p-type semiconductor substrate 10 can also affect the peripheral circuits 40, 50 near the LDMOS transistor 20, despite the trench oxide isolation provided by the oxide regions 102.

In the fifth embodiment, as in the fourth embodiment, when the drain of the MOSFET $Q_2$ is negatively biased, before parasitic diode $D_5$ turns on, the Schottky diode SBD (including the gold film 88) turns on and conducts current from the source to the drain of the LDMOS transistor 20. This current flow delays the turn-on of parasitic diode $D_5$. If the forward bias deepens far enough to turn on parasitic diode $D_5$, npn transistor $Tr_4$ also turns on as explained in the fourth embodiment and supplies more current to the drain of the LDMOS transistor 20, leaving only a relatively small amount of current to be supplied from the p-type semiconductor substrate 10 to the drain through parasitic diode $D_5$.

As described above, the H-bridge circuit in the fifth embodiment has a built-in Schottky transistor SBTr connected in parallel with parasitic diode $D_2$ of the lower-arm re-channel MOSFET $Q_2$. The built-in Schottky transistor SBTr includes a Schottky diode SBD having its anode connected to the source of MOSFET $Q_2$ and its cathode connected to the drain of MOSFET $Q_2$, and an npn transistor $Tr_4$ having its base and collector connected to the source of MOSFET $Q_2$ and its emitter connected to the drain of MOSFET $Q_2$.

With this configuration, if the drain of MOSFET $Q_2$ is negatively biased by regenerative current when MOSFET $Q_1$ is switched off, the same chain of events takes places as in the fourth embodiment. First the Schottky diode SBD turns on, delaying the turn-on of parasitic elements, and then the npn transistor $Tr_4$ turns on, providing a path that can conduct more current to the drain of the LDMOS transistor 20 than the can the path through parasitic diode $D_5$.

Although not shown in the drawings, the fifth embodiment provides a similar Schottky transistor for MOSFET $Q_4$, with similar effects.

As a result, MOSFET switching in the H-bridge circuit produces less current flow in the p-type semiconductor substrate 10, less disturbance to the potential of the p-type semiconductor substrate 10, and less electrical noise on the external wiring connected to the p-type semiconductor substrate 10.

A significant feature of the H-bridge circuit in the fifth embodiment is that it reduces regenerative current effects that cannot be eliminated by trench isolation, including effects on external circuits via ground wiring as well as effects on peripheral circuits in the H-bridge chip itself.

Another advantage of the fifth embodiment is that it does not require additional regenerative current diodes.

A few variations of the embodiments have been shown above, but those skilled in the art will recognize that further variations are possible within the scope of the invention, which is defined in the appended claims.

What is claimed is:

1. An H-bridge circuit having a power supply terminal, a ground terminal, a first node, and a second node, the H-bridge circuit comprising:
a first upper-arm MOSFET for conducting current between the power supply terminal and the first node;
a first lower-arm MOSFET for conducting current between the first node and the ground terminal, the first lower-arm MOSFET having a source connected to the ground terminal, a drain connected to the first node, and a first parasitic diode;
a second upper-arm MOSFET for conducting current between the power supply terminal and the second node;
a second lower-arm MOSFET for conducting current between the second node and the ground terminal, the second lower-arm MOSFET having a source connected to the ground terminal, a drain connected to the second node, and a second parasitic diode;
a coil load connected between the first node and the second node;
a first current supplying element connected in parallel with the first parasitic diode and conductively interconnecting the source and drain of the first lower-arm MOSFET when the drain of the first lower-arm MOSFET is negatively biased, thereby supplying current to the drain of the first lower-arm MOSFET; and
a second current supplying element connected in parallel with the second parasitic diode and conductively interconnecting the source and drain of the second lower-arm MOSFET when the drain of the second lower-arm MOSFET is negatively biased, thereby supplying current to the drain of the second lower-arm MOSFET.

2. The H-bridge circuit of claim 1, wherein:
the first current supplying element is a first parasitic npn transistor generated when the drain of the first lower-arm MOSFET is negatively biased, comprising a base and a collector having potentials equal to a source potential of the first lower-arm MOSFET and an emitter having a potential equal to a drain potential of the first lower-arm MOSFET; and
the second current supplying element is a second parasitic npn transistor generated when the drain of the second lower-arm MOSFET is negatively biased, comprising a base and a collector having potentials equal to a source potential of the second lower-arm MOSFET and an emitter having a potential equal to a drain potential of the second lower-arm MOSFET.

3. The H-bridge circuit of claim 2, further comprising:
a p-type semiconductor substrate;
an n-type epitaxial layer disposed on the p-type semiconductor substrate, at least the first lower-arm MOSFET and the second lower-arm MOSFET being formed in the n-type epitaxial layer;
peripheral circuitry formed in the n-type epitaxial layer;
first and second p-type regions extending through the n-type epitaxial layer to the p-type semiconductor substrate to isolate the first lower-arm MOSFET from peripheral circuitry by pn junction isolation, the first p-type region being disposed adjacent the first lower-arm MOSFET, the second p-type region being disposed adjacent the peripheral circuitry, the first p-type region also constituting the base of the first parasitic npn transistor;
a first n-type region formed between the first and second p-type regions, the first n-type diffusion region constituting the collector of the first parasitic npn transistor;
a second n-type region disposed in the n-type epitaxial layer, the second n-type region constituting the drain of the second MOSFET and the emitter of the first parasitic npn transistor;
third and fourth p-type regions extending through the n-type epitaxial layer to the p-type semiconductor substrate to isolate the second lower-arm MOSFET from the peripheral circuitry by pn junction isolation, the third p-type region being disposed adjacent the second lower-arm MOSFET, the fourth p-type region being disposed adjacent the peripheral circuitry, the first p-type region also constituting the base of the second parasitic npn transistor;
a third n-type region formed between the third and fourth p-type regions, the third n-type diffusion region constituting the collector of the second parasitic npn transistor; and
a fourth n-type region disposed in the n-type epitaxial layer, the fourth n-type region constituting the drain of the second MOSFET and the emitter of the first parasitic npn transistor.

4. The H-bridge circuit of claim 1, wherein:
the first current supplying element is a first npn transistor having a base and a collector connected to the source of the second lower-arm MOSFET and having an emitter connected to the drain of the second lower-arm MOSFET; and
the second current supplying element is a second npn transistor having a base and a collector connected to the source of the second lower-arm MOSFET and having an emitter connected to the drain of the second lower-arm MOSFET.

5. The H-bridge circuit of claim 4, further comprising:

a p-type semiconductor substrate;

an n-type epitaxial layer disposed on the p-type semiconductor substrate, at least the first lower-arm MOSFET and the second lower-arm MOSFET being formed in the n-type epitaxial layer;

peripheral circuitry formed in the n-type epitaxial layer;

a first p-type region extending through the n-type epitaxial layer to the p-type semiconductor substrate to isolate the first lower-arm MOSFET from the peripheral circuitry by pn junction isolation;

a second p-type region formed in the n-type epitaxial layer between the first lower-arm MOSFET and the first p-type region, the second p-type region constituting the base of the first npn transistor;

a first n-type surface region formed within the second p-type region, the first n-type surface region constituting the collector of the first npn transistor;

a first n-type buried layer disposed at an interface between the n-type epitaxial layer and the p-type substrate below the second p-type region, the first n-type buried layer being connected to the drain of the first lower-arm MOSFET and constituting the emitter of the first npn transistor;

a third p-type region extending through the n-type epitaxial layer to the p-type semiconductor substrate to isolate the second lower-arm MOSFET from the peripheral circuitry by pn junction isolation;

a fourth p-type region formed in the n-type epitaxial layer between the second lower-arm MOSFET and the third p-type region, the fourth p-type region constituting the base of the second npn transistor;

a second n-type surface region formed within the fourth p-type region, the second n-type surface region constituting the collector of the second npn transistor; and a second n-type buried layer disposed at an interface between the n-type epitaxial layer and the p-type substrate below the fourth p-type region, the second n-type buried layer being connected to the drain of the second lower-arm MOSFET and constituting the emitter of the second npn transistor.

6. The H-bridge circuit of claim 1, wherein:

the first current supplying element is a first Schottky diode having an anode connected to the source of the first lower-arm MOSFET and a cathode connected to the drain of the first lower-arm MOSFET; and the second current supplying element is a second Schottky diode with having an anode connected to the source of the second lower-arm MOSFET and a cathode connected to the drain of the second lower-arm MOSFET.

7. The H-bridge circuit of claim 6, further comprising:

a p-type semiconductor substrate;

an n-type epitaxial layer disposed on the p-type semiconductor substrate, at least the first lower-arm MOSFET and the second lower-arm MOSFET being formed in the n-type epitaxial layer;

peripheral circuitry formed in the n-type epitaxial layer;

a first p-type region extending through the n-type epitaxial layer to the p-type semiconductor substrate to isolate the first lower-arm MOSFET from the peripheral circuitry by pn junction isolation;

a first metal electrode formed on the n-type epitaxial layer between the first lower-arm MOSFET and the first p-type region, the first metal electrode constituting the anode of the first Schottky diode, the part of the n-type epitaxial layer below the first metal electrode constituting part of the cathode of the first Schottky diode;

a first n-type buried layer disposed at an interface between the n-type epitaxial layer and the p-type substrate below the first metal electrode, the first n-type buried layer being connected to the drain of the first lower-arm MOSFET and constituting another part of the cathode of the first Schottky diode;

a second p-type region extending through the n-type epitaxial layer to the p-type semiconductor substrate to isolate the second lower-arm MOSFET from the peripheral circuitry by pn junction isolation;

a second metal electrode formed on the n-type epitaxial layer between the second lower-arm MOSFET and the first p-type region, the second metal electrode constituting the anode of the second Schottky diode, the part of the n-type epitaxial layer below the second metal electrode constituting part of the cathode of the second Schottky diode; and a second n-type buried layer disposed at an interface between the n-type epitaxial layer and the p-type substrate below the second metal electrode, the second n-type buried layer being connected to the drain of the second lower-arm MOSFET and constituting another part of the cathode of the second Schottky diode.

8. The H-bridge circuit of claim 7, further comprising:

a third p-type region disposed in the n-type epitaxial layer and making contact with part of the first metal electrode; and a fourth p-type region disposed in the n-type epitaxial layer and making contact with part of the second metal electrode.

9. The H-bridge circuit of claim 1, wherein:

the first current supplying element comprises a first Schottky diode and a first npn transistor, the first Schottky diode having an anode connected to the source of the first lower-arm MOSFET and a cathode connected to the drain of the first lower-arm MOSFET, the first npn transistor having a base and a collector connected to the source of the first lower-arm MOSFET and an emitter connected to the drain of the first lower-arm MOSFET; and the second current supplying element comprises a second Schottky diode and a second npn transistor, the second Schottky diode having an anode connected to the source of the second lower-arm MOSFET and a cathode connected to the drain of the second lower-arm MOSFET, the second npn transistor having a base and a collector connected to the source of the second lower-arm MOSFET and an emitter connected to the drain of the second lower-arm MOSFET.

10. The H-bridge circuit of claim 9, further comprising:

a p-type semiconductor substrate;

an n-type epitaxial layer disposed on the p-type semiconductor substrate, at least the first lower-arm MOSFET and the second lower-arm MOSFET being formed in the n-type epitaxial layer;

peripheral circuitry formed in the n-type epitaxial layer;

a first p-type region extending through the n-type epitaxial layer to the p-type semiconductor substrate to isolate the first lower-arm MOSFET from the peripheral circuitry by pn junction isolation;

a second p-type region formed in the n-type epitaxial layer between the first lower-arm MOSFET and the first p-type region, the second p-type region constituting the base of the first npn transistor;

a first n-type surface region formed within the second p-type region, the first n-type surface region constituting the collector of the first npn transistor;

a first metal electrode formed on the n-type epitaxial layer between the first lower-arm MOSFET and the first p-type region, the first metal electrode constituting the anode of the first Schottky diode, the part of the n-type epitaxial layer below the first metal electrode constituting part of the cathode of the first Schottky diode;

a first n-type buried layer disposed at an interface between the n-type epitaxial layer and the p-type substrate below the second p-type region and the first metal electrode, the first n-type buried layer being connected to the drain of the first lower-arm MOSFET and constituting the emitter of the first npn transistor and another part of the cathode of the first Schottky diode;

a third p-type region extending through the n-type epitaxial layer to the p-type semiconductor substrate to isolate the second lower-arm MOSFET from the peripheral circuitry by pn junction isolation;

a fourth p-type region formed in the n-type epitaxial layer between the second lower-arm MOSFET and the third p-type region, the fourth p-type region constituting the base of the second npn transistor;

a second n-type surface region formed within the fourth p-type region, the second n-type surface region constituting the collector of the second npn transistor;

a second metal electrode formed on the n-type epitaxial layer between the second lower-arm MOSFET and the third p-type region, the second metal electrode constituting the anode of the second Schottky diode, the part of the n-type epitaxial layer below the first metal electrode constituting part of the cathode of the second Schottky diode; and a second n-type buried layer disposed at an interface between the n-type epitaxial layer and the p-type substrate below the fourth p-type region and the second metal electrode, the second n-type buried layer being connected to the drain of the second lower-arm MOSFET, the second n-type buried layer constituting the emitter of the second npn transistor and another part of the cathode of the second Schottky diode.

11. The H-bridge circuit of claim 10, wherein:
part of the first metal electrode makes contact with the second p-type region; and
part of the second metal electrode makes contact with the fourth p-type region.

12. The H-bridge circuit of claim 9, further comprising:
a p-type semiconductor substrate;
an n-type epitaxial layer disposed on the p-type semiconductor substrate, at least the first lower-arm MOSFET and the second lower-arm MOSFET being formed in the n-type epitaxial layer;
peripheral circuitry formed in the n-type epitaxial layer;
an n-type buried layer disposed at an interface between the n-type epitaxial layer and the p-type substrate below the first lower-arm MOSFET, the second lower-arm MOSFET, and the peripheral circuitry for pn-junction isolation, a first part of the n-type buried layer being connected to the drain of the first lower-arm MOSFET, the first part of the n-type buried layer constituting the emitter of the first npn transistor and part of the cathode of the first Schottky diode, a second part of the n-type buried layer being connected to the drain of the second lower-arm MOSFET, the second part of the n-type buried layer constituting the emitter of the second npn transistor and part of the cathode of the second Schottky diode;

a first dielectric region extending through the n-type epitaxial layer and the n-type buried layer to the p-type semiconductor substrate to isolate the first lower-arm MOSFET from the peripheral circuitry by trench isolation;

a first p-type region formed in the n-type epitaxial layer between the first lower-arm MOSFET and the first dielectric region, the first p-type region constituting the base of the first npn transistor;

a first n-type surface region formed within the first p-type region, the first n-type surface region constituting the collector of the first npn transistor;

a first metal electrode formed on the n-type epitaxial layer between the first lower-arm MOSFET and the first dielectric region, the first metal electrode constituting the anode of the first Schottky diode, the part of the n-type epitaxial layer below the first metal electrode constituting another part of the cathode of the first Schottky diode;

a second dielectric region extending through the n-type epitaxial layer and the n-type buried layer to the p-type semiconductor substrate to isolate the second lower-arm MOSFET from the peripheral circuitry by trench isolation;

a second p-type region formed in the n-type epitaxial layer between the second lower-arm MOSFET and the second dielectric region, the second p-type region constituting the base of the second npn transistor;

a second n-type surface region formed within the second p-type region, the second n-type surface region constituting the collector of the second npn transistor; and a second metal electrode formed on the n-type epitaxial layer between the second lower-arm MOSFET and the second dielectric region, the second metal electrode constituting the anode of the second Schottky diode, the part of the n-type epitaxial layer below the first metal electrode constituting another part of the cathode of the second Schottky diode.

13. The H-bridge circuit of claim 12, wherein:
part of the first metal electrode makes contact with the first p-type region; and
part of the second metal electrode makes contact with the second p-type region.

* * * * *